United States Patent
Xu et al.

(10) Patent No.: US 12,462,804 B2
(45) Date of Patent: Nov. 4, 2025

(54) VOICE CONTROL METHOD AND APPARATUS

(71) Applicant: HUAWEI TECHNOLOGIES CO., LTD., Guangdong (CN)

(72) Inventors: Jiaming Xu, Beijing (CN); Yue Lang, Shanghai (CN); Churonggui Sa, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 18/471,702

(22) Filed: Sep. 21, 2023

(65) Prior Publication Data

US 2024/0013789 A1 Jan. 11, 2024

Related U.S. Application Data

(63) Continuation of application No. PCT/CN2022/080436, filed on Mar. 11, 2022.

(30) Foreign Application Priority Data

Mar. 24, 2021 (CN) .......................... 202110313304.3

(51) Int. Cl.
*G10L 17/22* (2013.01)
*G10L 15/22* (2006.01)

(52) U.S. Cl.
CPC ........ *G10L 15/22* (2013.01); *G10L 2015/223* (2013.01)

(58) Field of Classification Search
USPC .................................................. 704/246, 273
See application file for complete search history.

(56) References Cited

U.S. PATENT DOCUMENTS

| | | | |
|---|---|---|---|
| 11,748,462 B2 * | 9/2023 | Lesso ....................... | A61B 5/12 726/19 |
| 2007/0168190 A1 * | 7/2007 | Itagaki ..................... | G07C 9/37 704/E17.015 |

(Continued)

FOREIGN PATENT DOCUMENTS

| CN | 110047490 A | 7/2019 |
|---|---|---|
| CN | 110265038 A | 9/2019 |

(Continued)

*Primary Examiner* — Abul K Azad
(74) *Attorney, Agent, or Firm* — WOMBLE BOND DICKINSON (US) LLP

(57) ABSTRACT

This application provides a voice control method and apparatus, a wearable device, and a terminal. The method includes: obtaining voice information of a user; obtaining identity information of the user based on a first voiceprint recognition result of a first voice component of the voice information, a second voiceprint recognition result of a second voice component of the voice information, and a third voiceprint recognition result of a third voice component of the voice information, where the first voice component is captured by an in-ear voice sensor of a wearable device, the second voice component is captured by an out-of-ear voice sensor of the wearable device, and the third voice component is captured by a bone vibration sensor of the wearable device; and executing an operation instruction when the identity information of the user matches the preset identity information.

20 Claims, 13 Drawing Sheets

(56) References Cited

U.S. PATENT DOCUMENTS

| | | | |
|---|---|---|---|
| 2017/0116995 A1* | 4/2017 | Ady | H04W 12/06 |
| 2019/0012448 A1 | 1/2019 | Lesso | |
| 2020/0160846 A1 | 5/2020 | Itakura et al. | |
| 2021/0366479 A1* | 11/2021 | Wexler | G10L 15/22 |
| 2022/0188392 A1* | 6/2022 | Zou | A61B 5/117 |

FOREIGN PATENT DOCUMENTS

| | | |
|---|---|---|
| CN | 111916101 A | 11/2020 |
| EP | 3790006 A1 | 3/2021 |
| JP | 2007017840 A | 1/2007 |
| JP | 2008033144 A | 2/2008 |
| JP | 2008224911 A | 9/2008 |
| JP | 2011525724 A | 9/2011 |
| JP | 2017142651 A | 8/2017 |
| JP | 2020086430 A | 6/2020 |
| TW | 200820218 A | 5/2008 |
| WO | 2009141828 A2 | 11/2009 |
| WO | 2019159253 A1 | 8/2019 |
| WO | 2020000427 A1 | 1/2020 |

\* cited by examiner

VOICE CONTROL METHOD AND APPARATUS

CROSS-REFERENCE TO RELATED APPLICATIONS

This application is a continuation of International Application No. PCT/CN2022/080436, filed on Mar. 11, 2022, which claims priority to Chinese Patent Application No. 202110313304.3, filed on Mar. 24, 2021. The disclosures of the aforementioned applications are hereby incorporated by reference in their entireties.

TECHNICAL FIELD

This application relates to the field of audio processing technologies, and in particular, to a voice control method and apparatus.

BACKGROUND

In a conventional technology, two voice sensors are usually used to capture two voice signals for voiceprint recognition, to perform identity authentication on a speaking user. In other words, only when voiceprint recognition results of two voice components are both that voiceprint features of the two voice components matches corresponding registered voiceprint features, it is determined that the speaking user is a preset user. A bone vibration sensor is a common voice sensor. When a sound is transmitted through a bone, the bone vibrates. The bone vibration sensor senses vibration of the bone, and converts a vibration signal into an electrical signal to capture the sound.

If one of the two voice sensors is a bone vibration sensor, because a current bone vibration sensor usually can capture only a low-frequency component (which is usually less than 1 kHz) of a voice signal of a speaker, a high-frequency component is lost. This is not conducive to voiceprint recognition, and consequently, voiceprint recognition is inaccurate.

SUMMARY

This application provides a voice control method and apparatus, to resolve a problem that when a bone vibration sensor is used, a high-frequency component is lost, and voiceprint recognition is inaccurate.

To achieve the foregoing objective, the following technical solutions are used in this application:

According to a first aspect, this application provides a voice control method, including: obtaining voice information of a user, where the voice information includes a first voice component, a second voice component, and a third voice component, the first voice component is captured by an in-ear voice sensor, the second voice component is captured by an out-of-ear voice sensor, and the third voice component is captured by a bone vibration sensor; performing voiceprint recognition on each of the first voice component, the second voice component, and the third voice component; obtaining identity information of the user based on a first voiceprint recognition result of the first voice component of the voice information, a second voiceprint recognition result of the second voice component of the voice information, and a third voiceprint recognition result of the third voice component of the voice information; and executing an operation instruction when the identity information of the user matches preset identity information, where the operation instruction is determined based on the voice information.

After the user wears a wearable device, an external auditory canal and a middle auditory canal form a closed cavity, and there is amplification effect, that is, cavity effect, for a sound in the cavity. Therefore, a sound captured by the in-ear voice sensor is clearer, and especially, there is obvious enhancement effect for a high-frequency sound signal. Because the in-ear voice sensor is used when the wearable device captures the sound, distortion caused when a high-frequency signal component of some voice information is lost when the bone vibration sensor captures voice information can be compensated for. Therefore, overall voiceprint capturing effect and voiceprint recognition accuracy of the wearable device can be improved, to improve user experience.

Before voiceprint recognition is performed, each voice component needs to be obtained. A plurality of voice components are obtained, to improve accuracy and anti-interference capability of voiceprint recognition.

In an embodiment, before the performing voiceprint recognition on the first voice component, the second voice component, and the third voice component, the method further includes: performing keyword detection on the voice information, or detecting user input. In an embodiment, when the voice information includes a preset keyword, voiceprint recognition is performed on each of the first voice component, the second voice component, and the third voice component; or when a preset operation entered by the user is received, voiceprint recognition is performed on each of the first voice component, the second voice component, and the third voice component. When the voice information does not include a preset keyword and a preset operation entered by the user is not received, it indicates that the user currently has no requirement for voiceprint recognition. In this case, a terminal or the wearable device does not need to enable a voiceprint recognition function, to reduce power consumption of the terminal or the wearable device.

In an embodiment, before the performing keyword detection on the voice information, or detecting user input, the method further includes: obtaining a worn state detection result of a wearable device. In an embodiment, when the worn state detection result is that the wearable device is in a worn state, keyword detection is performed on the voice information, or the user input is detected. When the worn state detection result does not pass, it indicates that the user does not wear the wearable device currently, and certainly, has no requirement for voiceprint recognition. In this case, the terminal or the wearable device does not need to enable a keyword detection function, to reduce power consumption of the terminal or the wearable device.

In an embodiment, a process of performing voiceprint recognition on the first voice component is:

performing feature extraction on the first voice component, to obtain a first voiceprint feature, and calculating a first similarity between the first voiceprint feature and a first registered voiceprint feature of the user, where the first registered voiceprint feature is obtained by performing feature extraction on a first registered voice by using a first voiceprint model, and the first registered voiceprint feature indicates a preset audio feature that is of the user and that is captured by the in-ear voice sensor. Voiceprint recognition is performed by calculating a similarity, to improve accuracy of voiceprint recognition.

In an embodiment, a process of performing voiceprint recognition on the second voice component is:

performing feature extraction on the second voice component, to obtain a second voiceprint feature, and calculating a second similarity between the second voiceprint feature and a second registered voiceprint feature of the user, where the second registered voiceprint feature is obtained by performing feature extraction on a second registered voice by using a second voiceprint model, and the second registered voiceprint feature indicates a preset audio feature that is of the user and that is captured by the out-of-ear voice sensor. Voiceprint recognition is performed by calculating a similarity, to improve accuracy of voiceprint recognition.

In an embodiment, a process of performing voiceprint recognition on the third voice component is:

performing feature extraction on the third voice component, to obtain a third voiceprint feature, and calculating a third similarity between the third voiceprint feature and a third registered voiceprint feature of the user, where the third registered voiceprint feature is obtained by performing feature extraction on a third registered voice by using a third voiceprint model, and the third registered voiceprint feature indicates a preset audio feature that is of the user and that is captured by the bone vibration sensor. Voiceprint recognition is performed by calculating a similarity, to improve accuracy of voiceprint recognition.

In an embodiment, the obtaining identity information of the user based on a first voiceprint recognition result of the first voice component of the voice information, a second voiceprint recognition result of the second voice component of the voice information, and a third voiceprint recognition result of the third voice component of the voice information may be fusing all voiceprint recognition results by using a dynamic fusion coefficient, to obtain the identity information of the user, and may be:

determining a first fusion coefficient corresponding to the first similarity, a second fusion coefficient corresponding to the second similarity, and a third fusion coefficient corresponding to the third similarity; and fusing the first similarity, the second similarity, and the third similarity based on the first fusion coefficient, the second fusion coefficient, and the third fusion coefficient, to obtain a fused similarity score, and if the fused similarity score is greater than a first threshold, determining that the identity information of the user matches preset identity information. In the method for obtaining the fused similarity score by fusing a plurality of similarities and performing determining, voiceprint recognition accuracy can be effectively improved.

In an embodiment, the determining a first fusion coefficient, a second fusion coefficient, and a third fusion coefficient may be: obtaining a decibel of an ambient sound based on a sound pressure sensor; determining a playing volume based on a playing signal of a loudspeaker; and determining each of the first fusion coefficient, the second fusion coefficient, and the third fusion coefficient based on the decibel of the ambient sound and the playing volume, where the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value. In an embodiment, the sound pressure sensor and the loudspeaker are a sound pressure sensor and a loudspeaker of the wearable device.

In an embodiment of the application, the dynamic fusion coefficient is used when similarities are fused. For different application environments, voiceprint recognition results obtained for voice signals with different attributes are fused by using the dynamic fusion coefficient, and the voice signals with different attributes compensate for each other, to improve voiceprint recognition robustness and accuracy. For example, when ambient noise is large or music is played by using a headset, recognition accuracy can be significantly improved. The voice signals with different attributes may also be understood as voice signals obtained by using different sensors (the in-ear voice sensor, the out-of-ear voice sensor, and the bone vibration sensor).

In an embodiment, the operation instruction includes an unlocking instruction, a payment instruction, a power-off instruction, an application starting instruction, or a call instruction. In this way, the user only needs to enter the voice information for one time, to complete a series of operations such as identity authentication of the user and performing a function, to greatly improve control efficiency of the user and user experience.

According to a second aspect, this application provides a voice control method. The voice control method is applied to a wearable device. In other words, the voice control method is performed by the wearable device. The method is as follows, and includes: The wearable device obtains voice information of a user, where the voice information includes a first voice component, a second voice component, and a third voice component, the first voice component is captured by an in-ear voice sensor, the second voice component is captured by an out-of-ear voice sensor, and the third voice component is captured by a bone vibration sensor; the wearable device performs voiceprint recognition on each of the first voice component, the second voice component, and the third voice component; the wearable device obtains identity information of the user based on a first voiceprint recognition result of the first voice component of the voice information, a second voiceprint recognition result of the second voice component of the voice information, and a third voiceprint recognition result of the third voice component of the voice information; and the wearable device executes an operation instruction when the identity information of the user matches preset identity information, where the operation instruction is determined based on the voice information.

After the user wears the wearable device, an external auditory canal and a middle auditory canal form a closed cavity, and there is amplification effect, that is, cavity effect, for a sound in the cavity. Therefore, a sound captured by the in-ear voice sensor is clearer, and especially, there is obvious enhancement effect for a high-frequency sound signal. Because the in-ear voice sensor is used when the wearable device captures the sound, distortion caused when a high-frequency signal component of some voice information is lost when the bone vibration sensor captures voice information can be compensated for. Therefore, overall voiceprint capturing effect and voiceprint recognition accuracy of the wearable device can be improved, to improve user experience.

Before the wearable device performs voiceprint recognition, the wearable device needs to first obtain each voice component. The wearable device obtains three voice components by using different sensors of the in-ear voice sensor, the out-of-ear voice sensor, and the bone vibration sensor, to improve accuracy and an anti-interference capability of voiceprint recognition.

In an embodiment, before the wearable device performs voiceprint recognition on the first voice component, the second voice component, and the third voice component, the method further includes: The wearable device performs keyword detection on the voice information, or detects user input. In an embodiment, when the voice information includes a preset keyword, the wearable device performs voiceprint recognition on each of the first voice component, the second voice component, and the third voice component; or when a preset operation entered by the user is received, the wearable device performs voiceprint recognition on each of the first voice component, the second voice component, and the third voice component. When the voice information does not include a preset keyword and a preset operation entered by the user is not received, it indicates that the user currently has no requirement for voiceprint recognition. In this case, the wearable device does not need to enable a voiceprint recognition function, to reduce power consumption of the wearable device.

In an embodiment, before the wearable device performs keyword detection on the voice information, or detects the user input, the method further includes: obtaining a worn state detection result of the wearable device. In an embodiment, when the worn state detection result is that the wearable device is in a worn state, keyword detection is performed on the voice information, or the user input is detected. When the worn state detection result does not pass, it indicates that the user does not wear the wearable device currently, and certainly, has no requirement for voiceprint recognition. In this case, the wearable device does not need to enable a keyword detection function, to reduce power consumption of the wearable device.

In an embodiment, a process in which the wearable device performs voiceprint recognition on the first voice component is:

The wearable device performs feature extraction on the first voice component, to obtain a first voiceprint feature, and the wearable device calculates a first similarity between the first voiceprint feature and a first registered voiceprint feature of the user, where the first registered voiceprint feature is obtained by performing feature extraction on a first registered voice by using a first voiceprint model, and the first registered voiceprint feature indicates a preset audio feature that is of the user and that is captured by the in-ear voice sensor. Voiceprint recognition is performed by calculating a similarity, to improve accuracy of voiceprint recognition.

In an embodiment, a process in which the wearable device performs voiceprint recognition on the second voice component is:

The wearable device performs feature extraction on the second voice component, to obtain a second voiceprint feature, and the wearable device calculates a second similarity between the second voiceprint feature and a second registered voiceprint feature of the user, where the second registered voiceprint feature is obtained by performing feature extraction on a second registered voice by using a second voiceprint model, and the second registered voiceprint feature indicates a preset audio feature that is of the user and that is captured by the out-of-ear voice sensor. Voiceprint recognition is performed by calculating a similarity, to improve accuracy of voiceprint recognition.

In an embodiment, a process in which the wearable device performs voiceprint recognition on the third voice component is:

The wearable device performs feature extraction on the third voice component, to obtain a third voiceprint feature, and the wearable device calculates a third similarity between the third voiceprint feature and a third registered voiceprint feature of the user, where the third registered voiceprint feature is obtained by performing feature extraction on a third registered voice by using a third voiceprint model, and the third registered voiceprint feature indicates a preset audio feature that is of the user and that is captured by the bone vibration sensor. Voiceprint recognition is performed by calculating a similarity, to improve accuracy of voiceprint recognition.

In an embodiment, that the wearable device obtains identity information of the user based on a first voiceprint recognition result of the first voice component of the voice information, a second voiceprint recognition result of the second voice component of the voice information, and a third voiceprint recognition result of the third voice component of the voice information may be fusing all voiceprint recognition results by using a dynamic fusion coefficient, to obtain the identity information of the user, and may be:

The wearable device determines a first fusion coefficient corresponding to the first similarity, a second fusion coefficient corresponding to the second similarity, and a third fusion coefficient corresponding to the third similarity; and the wearable device fuses the first similarity, the second similarity, and the third similarity based on the first fusion coefficient, the second fusion coefficient, and the third fusion coefficient, to obtain a fused similarity score, and if the fused similarity score is greater than a first threshold, determines that the identity information of the user matches preset identity information. In the method for obtaining the fused similarity score by fusing a plurality of similarities and performing determining, voiceprint recognition accuracy can be effectively improved.

In an embodiment, that the wearable device determines the first fusion coefficient, the second fusion coefficient, and the third fusion coefficient may be: obtaining a decibel of an ambient sound based on a sound pressure sensor; determining a playing volume based on a playing signal of a loudspeaker; and determining each of the first fusion coefficient, the second fusion coefficient, and the third fusion coefficient based on the decibel of the ambient sound and the playing volume, where the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value. In an embodiment, the sound pressure sensor and the loudspeaker are a sound pressure sensor and a loudspeaker of the wearable device.

In an embodiment of the application, the dynamic fusion coefficient is used when similarities are fused. For different application environments, voiceprint recognition results obtained for voice signals with different attributes are fused by using the dynamic fusion coefficient, and the voice signals with different attributes compensate for each other, to improve voiceprint recognition robustness and accuracy. For example, when ambient noise is large or music is played by using a headset, recognition accuracy can be significantly improved. The voice signals with different attributes may also be understood as voice signals obtained by using different sensors (the in-ear voice sensor, the out-of-ear voice sensor, and the bone vibration sensor).

In an embodiment, the wearable device sends an instruction to a terminal, and the terminal executes an operation instruction corresponding to the voice information. The operation instruction includes an unlocking instruction, a payment instruction, a power-off instruction, an application starting instruction, or a call instruction. In this way, the user only needs to enter the voice information for one time, to complete a series of operations such as identity authentication of the user and performing a function, to greatly improve control efficiency of the user for the wearable device and user experience.

According to a third aspect, this application provides a voice control method. The voice control method is applied to a terminal. In other words, the voice control method is performed by the terminal. The method is as follows, and includes: The terminal obtains voice information of a user, where the voice information includes a first voice component, a second voice component, and a third voice component, the first voice component is captured by an in-ear voice sensor, the second voice component is captured by an out-of-ear voice sensor, and the third voice component is captured by a bone vibration sensor; the terminal performs voiceprint recognition on each of the first voice component, the second voice component, and the third voice component; the terminal obtains identity information of the user based on a first voiceprint recognition result of the first voice component of the voice information, a second voiceprint recognition result of the second voice component of the voice information, and a third voiceprint recognition result of the third voice component of the voice information; and the terminal executes an operation instruction when the identity information of the user matches preset identity information, where the operation instruction is determined based on the voice information.

After the user wears a wearable device, an external auditory canal and a middle auditory canal form a closed cavity, and there is amplification effect, that is, cavity effect, for a sound in the cavity. Therefore, a sound captured by the in-ear voice sensor is clearer, and especially, there is obvious enhancement effect for a high-frequency sound signal. Because the in-ear voice sensor is used when the wearable device captures the sound, distortion caused when a high-frequency signal component of some voice information is lost when the bone vibration sensor captures voice information can be compensated for. Therefore, overall voiceprint capturing effect and voiceprint recognition accuracy of the terminal can be improved, to improve user experience.

In an embodiment, after obtaining the voice information entered by the user, the wearable device sends a voice component corresponding to the voice information to the terminal, so that the terminal performs voiceprint recognition based on the voice component. When the voice control method is performed on a terminal side, computing power of the terminal can be effectively used, so that accuracy of identity authentication can still be ensured when computing power of the wearable device is insufficient.

Before the terminal performs voiceprint recognition, the terminal needs to first obtain each voice component. The wearable device obtains three voice components by using different sensors of the in-ear voice sensor, the out-of-ear voice sensor, and the bone vibration sensor, and sends the three voice components to the terminal, to improve accuracy and an anti-interference capability of voiceprint recognition of the terminal.

In an embodiment, before the terminal performs voiceprint recognition on the first voice component, the second voice component, and the third voice component, the method further includes: performing keyword detection on the voice information, or detecting user input. In an embodiment, when the voice information includes a preset keyword, the wearable device sends a voice component corresponding to the voice information to the terminal, and the terminal performs voiceprint recognition on each of the first voice component, the second voice component, and the third voice component; or when a preset operation entered by the user is received, the terminal performs voiceprint recognition on each of the first voice component, the second voice component, and the third voice component. When the voice information does not include a preset keyword and a preset operation entered by the user is not received, it indicates that the user currently has no requirement for voiceprint recognition. In this case, the wearable device does not need to enable a voiceprint recognition function, to reduce power consumption of the terminal.

In an embodiment, before the performing keyword detection on the voice information, or detecting user input, the method further includes: obtaining a worn state detection result of the wearable device. In an embodiment, when the worn state detection result is that the wearable device is in a worn state, keyword detection is performed on the voice information, or the user input is detected. When the worn state detection result does not pass, it indicates that the user does not wear the wearable device currently, and certainly, has no requirement for voiceprint recognition. In this case, the wearable device does not need to enable a keyword detection function, to reduce power consumption of the wearable device.

In an embodiment, a process in which the terminal performs voiceprint recognition on the first voice component is:

The terminal performs feature extraction on the first voice component, to obtain a first voiceprint feature, and the terminal calculates a first similarity between the first voiceprint feature and a first registered voiceprint feature of the user, where the first registered voiceprint feature is obtained by performing feature extraction on a first registered voice by using a first voiceprint model, and the first registered voiceprint feature indicates a preset audio feature that is of the user and that is captured by the in-ear voice sensor. Voiceprint recognition is performed by calculating a similarity, to improve accuracy of voiceprint recognition.

In an embodiment, a process in which the terminal performs voiceprint recognition on the second voice component is:

The terminal performs feature extraction on the second voice component, to obtain a second voiceprint feature, and the terminal calculates a second similarity between the second voiceprint feature and a second registered voiceprint feature of the user, where the second registered voiceprint feature is obtained by performing feature extraction on a second registered voice by using a second voiceprint model, and the second registered voiceprint feature indicates a preset audio feature that is of the user and that is captured by the out-of-ear voice sensor. Voiceprint recognition is performed by calculating a similarity, to improve accuracy of voiceprint recognition.

In an embodiment, a process in which the terminal performs voiceprint recognition on the third voice component is:

The terminal performs feature extraction on the third voice component, to obtain a third voiceprint feature, and the terminal calculates a third similarity between the third voiceprint feature and a third registered voiceprint feature of the user, where the third registered voiceprint feature is obtained by performing feature extraction on a third registered voice by using a third voiceprint model, and the third registered voiceprint feature indicates a preset audio feature that is of the user and that is captured by the bone vibration sensor. Voiceprint recognition is performed by calculating a similarity, to improve accuracy of voiceprint recognition.

In an embodiment, that the terminal obtains identity information of the user based on a first voiceprint recognition result of the first voice component of the voice information, a second voiceprint recognition result of the second voice component of the voice information, and a third voiceprint recognition result of the third voice component of the voice information may be fusing all voiceprint recognition results by using a dynamic fusion coefficient, to obtain the identity information of the user, and may be:

The terminal determines a first fusion coefficient corresponding to the first similarity, a second fusion coefficient corresponding to the second similarity, and a third fusion coefficient corresponding to the third similarity; and the terminal fuses the first similarity, the second similarity, and the third similarity based on the first fusion coefficient, the second fusion coefficient, and the third fusion coefficient, to obtain a fused similarity score, and if the fused similarity score is greater than a first threshold, determines that the identity information of the user matches preset identity information. In the method for obtaining the fused similarity score by fusing a plurality of similarities and performing determining, voiceprint recognition accuracy can be effectively improved.

In an embodiment, that the terminal determines the first fusion coefficient, the second fusion coefficient, and the third fusion coefficient may be: The wearable device obtains a decibel of an ambient sound based on a sound pressure sensor; and determines a playing volume based on a playing signal of a loudspeaker. After detecting the decibel of the ambient sound and the playing volume, the wearable device sends data to the terminal. The terminal determines each of the first fusion coefficient, the second fusion coefficient, and the third fusion coefficient based on the decibel of the ambient sound and the playing volume. The second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value. In an embodiment, the sound pressure sensor and the loudspeaker are a sound pressure sensor and a loudspeaker of the wearable device.

In an embodiment of the application, the dynamic fusion coefficient is used when similarities are fused. For different application environments, voiceprint recognition results obtained for voice signals with different attributes are fused by using the dynamic fusion coefficient, and the voice signals with different attributes compensate for each other, to improve voiceprint recognition robustness and accuracy. For example, when ambient noise is large or music is played by using a headset, recognition accuracy can be significantly improved. The voice signals with different attributes may also be understood as voice signals obtained by using different sensors (the in-ear voice sensor, the out-of-ear voice sensor, and the bone vibration sensor).

In an embodiment, the terminal executes an operation instruction corresponding to the voice information. The operation instruction includes an unlocking instruction, a payment instruction, a power-off instruction, an application starting instruction, or a call instruction. In this way, the user only needs to enter the voice information for one time, to complete a series of operations such as identity authentication of the user and performing a function of the terminal, to greatly improve control efficiency of the user for the terminal and user experience.

According to a fourth aspect, this application provides a voice control apparatus, including: a voice information obtaining unit, where the voice information obtaining unit is configured to obtain voice information of a user, where the voice information includes a first voice component, a second voice component, and a third voice component, the first voice component is captured by an in-ear voice sensor, the second voice component is captured by an out-of-ear voice sensor, and the third voice component is captured by a bone vibration sensor; a recognition unit, where the recognition unit is configured to perform voiceprint recognition on each of the first voice component, the second voice component, and the third voice component; an identity information obtaining unit, where the identity information obtaining unit is configured to obtain identity information of the user based on a voiceprint recognition result of the first voice component, a voiceprint recognition result of the second voice component, and a voiceprint recognition result of the third voice component; and an execution unit, where the execution unit is configured to execute an operation instruction when the identity information of the user matches preset identity information, where the operation instruction is determined based on the voice information.

After the user wears a wearable device, an external auditory canal and a middle auditory canal form a closed cavity, and there is amplification effect, that is, cavity effect, for a sound in the cavity. Therefore, a sound captured by the in-ear voice sensor is clearer, and especially, there is obvious enhancement effect for a high-frequency sound signal. Because the in-ear voice sensor is used when the wearable device captures the sound, distortion caused when a high-frequency signal component of some voice information is lost when the bone vibration sensor captures voice information can be compensated for. Therefore, overall voiceprint capturing effect and voiceprint recognition accuracy of the wearable device can be improved, to improve user experience. Before a voiceprint recognition result is obtained, each voice component needs to be obtained. A plurality of voice components are obtained, to improve accuracy and anti-interference capability of voiceprint recognition.

In an embodiment, the voice information obtaining unit is further configured to: perform keyword detection on the voice information, or detect user input. In an embodiment, when the voice information includes a preset keyword, voiceprint recognition is performed on each of the first voice component, the second voice component, and the third voice component; or when a preset operation entered by the user is received, voiceprint recognition is performed on each of the first voice component, the second voice component, and the third voice component. When the voice information does not include a preset keyword and a preset operation entered by the user is not received, it indicates that the user currently has no requirement for voiceprint recognition. In this case, a terminal or the wearable device does not need to enable a voiceprint recognition function, to reduce power consumption of the terminal or the wearable device.

In an embodiment, the voice information obtaining unit is further configured to obtain a worn state detection result of a wearable device. In an embodiment, when the worn state detection result is that the wearable device is in a worn state, keyword detection is performed on the voice information, or the user input is detected. When the worn state detection result does not pass, it indicates that the user does not wear the wearable device currently, and certainly, has no requirement for voiceprint recognition. In this case, the terminal or the wearable device does not need to enable a keyword detection function, to reduce power consumption of the terminal or the wearable device.

In an embodiment, the recognition unit is configured to: perform feature extraction on the first voice component, to obtain a first voiceprint feature, and calculate a first similarity between the first voiceprint feature and a first registered voiceprint feature of the user, where the first registered voiceprint feature is obtained by performing feature extraction on a first registered voice by using a first voiceprint model, and the first registered voiceprint feature indicates a preset audio feature that is of the user and that is captured by the in-ear voice sensor; perform feature extraction on the second voice component, to obtain a second voiceprint feature, and calculate a second similarity between the second voiceprint feature and a second registered voiceprint feature of the user, where the second registered voiceprint feature is obtained by performing feature extraction on a second registered voice by using a second voiceprint model, and the second registered voiceprint feature indicates a preset audio feature that is of the user and that is captured by the out-of-ear voice sensor; and perform feature extraction on the third voice component, to obtain a third voiceprint feature, and calculate a third similarity between the third voiceprint feature and a third registered voiceprint feature of the user, where the third registered voiceprint feature is obtained by performing feature extraction on a third registered voice by using a third voiceprint model, and the third registered voiceprint feature indicates a preset audio feature that is of the user and that is captured by the bone vibration sensor. Voiceprint recognition is performed by calculating a similarity, to improve accuracy of voiceprint recognition.

In an embodiment, the identity information obtaining unit may obtain the identity information by using a dynamic fusion coefficient, and the identity information obtaining unit is configured to: determine a first fusion coefficient corresponding to the first similarity, a second fusion coefficient corresponding to the second similarity, and a third fusion coefficient corresponding to the third similarity; and fuse the first similarity, the second similarity, and the third similarity based on the first fusion coefficient, the second fusion coefficient, and the third fusion coefficient, to obtain a fused similarity score, and if the fused similarity score is greater than a first threshold, determine that the identity information of the user matches preset identity information. In the method for obtaining the fused similarity score by fusing a plurality of similarities and performing determining, voiceprint recognition accuracy can be effectively improved.

In an embodiment, the identity information obtaining unit is configured to: obtain a decibel of an ambient sound based on a sound pressure sensor; determine a playing volume based on a playing signal of a loudspeaker; and determine each of the first fusion coefficient, the second fusion coefficient, and the third fusion coefficient based on the decibel of the ambient sound and the playing volume, where the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value.

In an embodiment of the application, the dynamic fusion coefficient is used when similarities are fused. For different application environments, voiceprint recognition results obtained for voice signals with different attributes are fused by using the dynamic fusion coefficient, and the voice signals with different attributes compensate for each other, to improve voiceprint recognition robustness and accuracy. For example, when ambient noise is large or music is played by using a headset, recognition accuracy can be significantly improved. The voice signals with different attributes may also be understood as voice signals obtained by using different sensors (the in-ear voice sensor, the out-of-ear voice sensor, and the bone vibration sensor).

In an embodiment, if the user is a preset user, the execution unit is configured to execute an operation instruction corresponding to the voice information. The operation instruction includes an unlocking instruction, a payment instruction, a power-off instruction, an application starting instruction, or a call instruction. In this way, the user only needs to enter the voice information for one time, to complete a series of operations such as identity authentication of the user and performing a function, to greatly improve control efficiency of the user and user experience.

It can be understood that, the voice control apparatus provided in the fourth aspect of this application can be understood as a terminal or a wearable device, and depends on an execution body of the voice control method. This is not limited in this application.

According to a fifth aspect, this application provides a wearable device, including: an in-ear voice sensor, an out-of-ear voice sensor, a bone vibration sensor, a memory, and a processor. The in-ear voice sensor is configured to capture a first voice component of voice information, the out-of-ear voice sensor is configured to capture a second voice component of the voice information, and the bone vibration sensor is configured to capture a third voice component of the voice information. The memory is coupled to the processor. The memory is configured to store computer program code. The computer program code includes computer instructions. When the processor executes the computer instructions, the wearable device performs the voice control method according to any one of the first aspect or the possible implementations of the first aspect or the second aspect or the possible implementations of the second aspect.

According to a sixth aspect, this application provides a terminal, including a memory and a processor. The memory is coupled to the processor. The memory is configured to store computer program code. The computer program code includes computer instructions. When the processor executes the computer instructions, the terminal performs the voice control method according to any one of the first aspect or the possible implementations of the first aspect or the third aspect or the possible implementations of the third aspect.

According to a seventh aspect, this application provides a chip system. The chip system is applied to an electronic device, the chip system includes one or more interface circuits and one or more processors, the interface circuit and the processor are connected to each other through a line, the interface circuit is configured to: receive a signal from a memory of the electronic device, and send the signal to the processor, the signal includes computer instructions stored in the memory, and when the processor executes the computer instructions, the electronic device performs the voice control method according to any one of the first aspect or the possible implementations of the first aspect.

According to an eighth aspect, this application provides a computer storage medium, including computer instructions. When the computer instructions are run on a voice control apparatus, the voice control apparatus is enabled to perform the voice control method according to any one of the first aspect or the possible implementations of the first aspect.

According to a ninth aspect, this application provides a computer program product. The computer program product includes computer instructions. When the computer instructions are run on a voice control apparatus, the voice control apparatus is enabled to perform the voice control method according to any one of the first aspect or the possible implementations of the first aspect.

It can be understood that, the wearable device according to the fifth aspect, the terminal according to the sixth aspect, the chip system according to the seventh aspect, the computer storage medium according to the eighth aspect, and the computer program product according to the ninth aspect each are configured to perform a corresponding method provided above. Therefore, for beneficial effects that can be achieved by the wearable device according to the fifth aspect, the terminal according to the sixth aspect, the chip system according to the seventh aspect, the computer storage medium according to the eighth aspect, and the computer program product according to the ninth aspect, refer to beneficial effects in the corresponding method provided above. Details are not described herein again.

DESCRIPTION OF EMBODIMENTS

Figure 1:
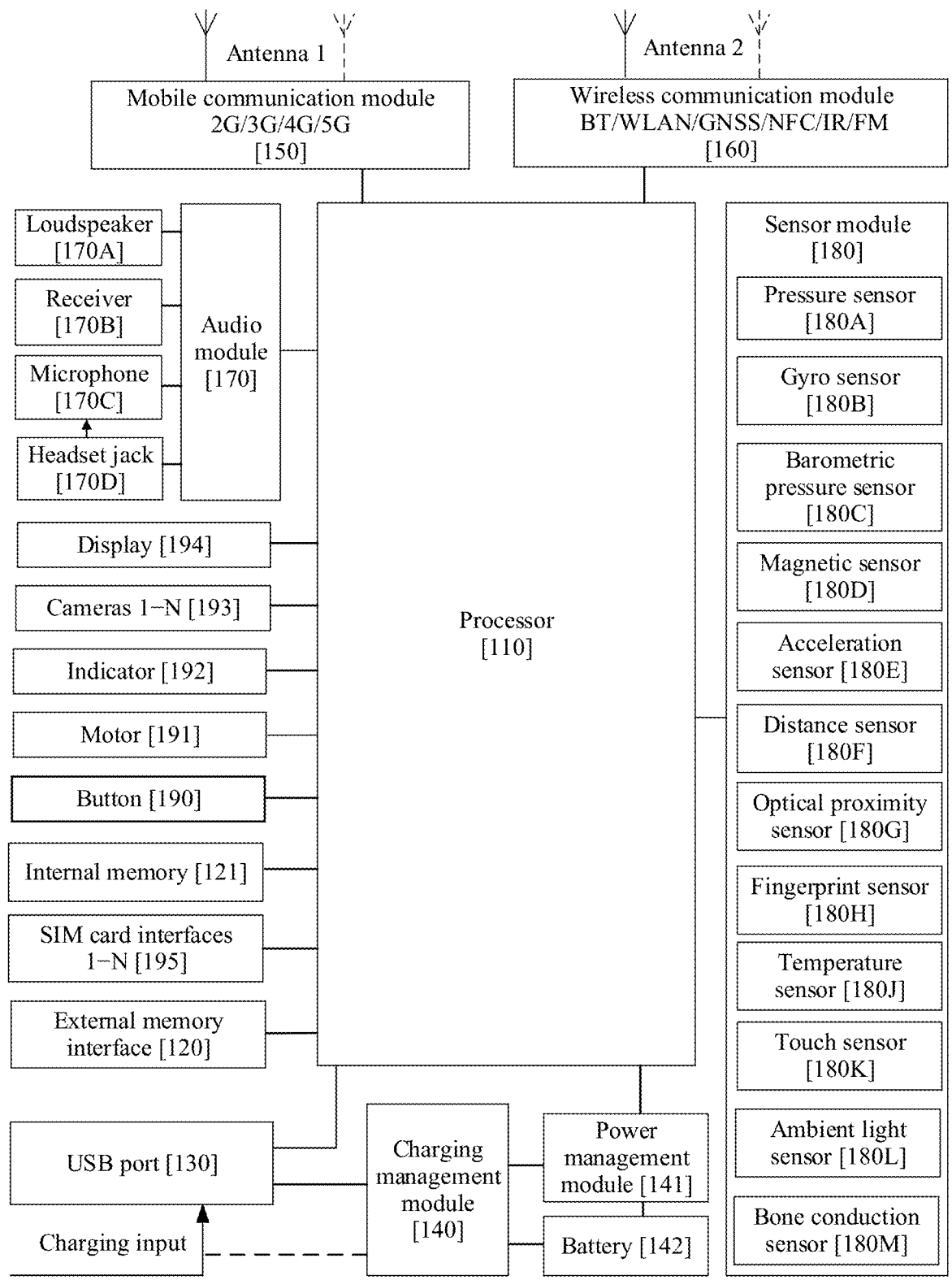
FIG. 1 is a schematic diagram of a hardware structure of a mobile phone according to an embodiment of this application.

The following describes technical solutions in this application with reference to the accompanying drawings. It is clear that the described embodiments are some but not all of embodiments of this application. It can be learned by one of ordinary skilled in the art that, with development of a technology and emergence of a new scenario, the technical solutions provided in embodiments of this application are also applicable to similar technical problems.

The terms "first" and "second" mentioned below are merely intended for a purpose of description, and shall not be understood as an indication or implication of relative importance or implicit indication of a quantity of indicated technical features. Therefore, a feature limited to "first" or "second" may explicitly or implicitly include one or more features. It should be understood that, data used in such a manner is interchangeable in a proper case, so that the embodiments described herein can be implemented in an order other than the order illustrated or described herein. In descriptions of embodiments, unless otherwise specified, "a plurality of" means two or more. In addition, the terms "include" and "have" and any other variants thereof mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved.

As an audio processing technology increasingly develops, a voiceprint recognition method has become an important hot problem in the audio processing field. A voiceprint is a sound wave spectrum that carries voice information and is displayed by an electric acoustic instrument. The voiceprint is stable, measurable, unique, or the like. In adulthood, a sound of a person may remain stable for a long period of time. Sizes and forms of vocal organs used when persons are speaking greatly differ from each other. Therefore, voiceprint graphs of any two persons are different, and distributions of resonant peaks of sounds of different persons in a spectrogram are different. Voiceprint recognition is to compare phonation of speakers of two voices for a same phoneme to determine whether the speakers are a same person, to implement a function of "recognizing a person by hearing a voice".

Voiceprint recognition (VR) is one of biometric recognition technologies, also referred to as speaker recognition, and is to extract voiceprint information from a voice signal provided by a speaker. From a perspective of application, voiceprint recognition can include: speaker identification (SI), where the speaker identification is used to determine a person in several persons who speaks a voice, and is a "multichotomous" problem; and speaker verification (SV), where the speaker verification is used to check whether a voice is spoken by a specified person, and is a "one-to-one determining" problem. This application mainly relates to a speaker verification technology.

The voiceprint recognition technology may be applied to a terminal user identification scenario, or may be applied to a householder identification scenario of home security. This is not limited in this application.

In a common voiceprint recognition technology, voiceprint recognition is performed by capturing one or two voice signals. To be specific, a user is determined as a preset user only when voiceprint recognition results of two voice components are both that voiceprint features of the two voice components matches corresponding registered voiceprint features. However, there are two problems. Problem 1 is that a voice component captured in a multi-person speaking scenario or a background with strong interference environment noise interferes with a voiceprint recognition result, and consequently, identity authentication is inaccurate or even incorrect. Provided that any voice component is captured in an interference environment, voiceprint recognition performance deteriorates, and an identity authentication result is wrongly determined. That is, in an existing voiceprint recognition technology, noise from various directions cannot be suppressed well, to reduce voiceprint recognition accuracy.

Problem 2: If one of two voice sensors is a bone vibration sensor, because a current bone vibration sensor usually can capture only a low-frequency component (which is usually less than 1 kHz) of a voice signal of a speaker, a high-frequency component is lost. This is not conducive to voiceprint recognition, and consequently, voiceprint recognition is inaccurate and even wrong, because a voice making characteristic of a speaker in each frequency band needs to be described for voiceprint recognition.

In view of this, an embodiment of this application provides a voice control method. It can be understood that the method in an embodiment may be performed by a terminal. The terminal establishes a connection to a wearable device, can obtain voice information captured by the wearable device, and can perform voiceprint recognition on the voice information. The method in an embodiment may alternatively be performed by the wearable device. The wearable device includes a processor having a computing capability, and can directly perform voiceprint recognition on captured voice information. The method in an embodiment may be performed by a server. The server establishes a connection to a wearable device, can obtain voice information captured by the wearable device, and can perform voiceprint recognition on the voice information. In an actual application process, an execution body of the method in an embodiment may be determined based on a computing power of a chip of the wearable device. For example, when the computing power of the chip of the wearable device is high, the wearable device may perform the method in an embodiment. When the computing power of the chip of the wearable device is low, the terminal connected to the wearable device may perform the method in an embodiment, or a server connected to the wearable device may perform the method in an embodiment. For ease of description, the following describes an embodiment of the application in detail by using an example in which a terminal connected to the wearable device performs the method in an embodiment, an example in which the wearable device performs the method in an embodiment, and an example in which the server connected to the wearable device performs the method in an embodiment.

The terminal, also referred to as user equipment (UE), a mobile station (MS), a mobile terminal (MT), or the like, is a device that can perform a wired connection or a wireless connection to the wearable device, to provide voice and/or data connectivity for a user, for example, a handheld device or a vehicle-mounted device whose wireless connection function is allowed. Currently, some examples of the terminal device are a mobile phone (mobile phone), a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in telesurgery (remote medical surgery), a wireless terminal in smart grid, a wireless terminal in transportation safety, a wireless terminal in a smart city (smart city), a wireless terminal in a smart home, or the like. This is not limited in an embodiment of the application.

When the voice control method is performed by the terminal, the voice control method may be implemented by using an application that is installed on the terminal and that is used to recognize a voiceprint.

The application used to recognize a voiceprint may be an embedded application (that is, a system application of the terminal) installed in the terminal or a downloadable application. The embedded application is an application provided as a part of the terminal (for example, a mobile phone). The downloadable application is an application that can provide an internet protocol multimedia subsystem (IMS) connection of the downloadable application. The downloadable application is an application that may be pre-installed in the terminal or a third-party application that may be downloaded by the user and installed in the terminal.

For ease of understanding, the following first describes a terminal, a wearable device, and a server to which a method in embodiments of this application is applied. Refer to FIG. 1. An example in which the terminal is a mobile phone is used. FIG. 1 shows a hardware structure of a mobile phone. As shown in FIG. 1, a mobile phone 10 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in an embodiment of the application does not constitute a limitation on the mobile phone. In some other embodiments of this application, the mobile phone may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The processor 110 can perform a voiceprint recognition algorithm provided in embodiments of this application.

The controller may be a nerve center and a command center of the mobile phone. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identification module (SIM) interface, a universal serial bus (USB) port, and/or the like. The terminal may establish a wired communication connection to the wearable device through an interface. The terminal may obtain, through the interface, a first voice component captured by the wearable device by using an in-ear voice sensor, a second voice component captured by using an out-of-ear voice sensor, and a third voice component captured by using a bone vibration sensor.

The I2C interface is a two-way synchronization serial bus, and includes a serial data line (SDA) and a serial clock line (SCL). The I2S interface may be configured to perform audio communication. The PCM interface may also be used to perform audio communication, and sample, quantize, and code an analog signal. The UART interface is a universal serial data bus, and is configured to perform asynchronous communication. The bus may be a two-way communication bus. The UART interface converts to-be-transmitted data between serial communication and parallel communication. The MIPI interface may be configured to connect the processor 110 to a peripheral component such as the display 194 or the camera 193. The MIPI interface includes a camera serial interface (CSI), a display serial interface (DSI), and the like. The GPIO interface may be configured by software. The GPIO interface may be configured as a control signal or a data signal. The USB port 130 is an interface that conforms to a USB standard specification, and may be a mini USB port, a micro USB port, a USB Type C port, or the like. The USB port 130 may be configured to be connected to a charger to charge the mobile phone, or may be configured to transmit data between the mobile phone and a peripheral device, or may be configured to be connected to a headset, to play audio by using the headset. The interface may be further configured to be connected to another electronic device, for example, an AR device.

It can be understood that an interface connection relationship between the modules shown in an embodiment of the application is merely an example for description, and constitutes no limitation on the structure of the mobile phone. In some other embodiments of this application, different interface connection manners in the foregoing embodiment or a combination of a plurality of interface connection manners may alternatively be used for the mobile phone.

The charging management module 140 is configured to receive a charging input from the charger. The charger may be a wireless charger or a wired charger. The power management module 141 is configured to be connected to the battery 142, the charging management module 140, and the processor 110. The power management module 141 receives input from the battery 142 and/or the charging management module 140, to supply power to the processor 110, the internal memory 121, an external memory, the display 194, the camera 193, the wireless communication module 160, and the like. The power management module 141 may be further configured to monitor a parameter such as a battery capacity, a battery cycle count, or a battery health status (electric leakage or impedance).

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone may be configured to cover one or more communication frequency bands Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution including 2G/3G/4G/5G, or the like applied to the mobile phone. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110. The modem processor may include a modulator and a demodulator.

The wireless communication module 160 may provide a wireless communication solution that is applied to the mobile phone and that includes a wireless local area network (WLAN) (for example, a wireless fidelity (Wi-Fi) network), Bluetooth (BT), a GNSS, frequency modulation (FM), a near field communication (NFC) technology, and an infrared (IR) technology. The wireless communication module 160 may be one or more components integrating at least one communication processing module. The wireless communication module 160 receives an electromagnetic wave through the antenna 2, performs modulation and filtering processing on an electromagnetic wave signal, and sends the processed signal to the processor 110. The wireless communication module 160 may further receive a to-be-sent signal from the processor 110, perform frequency modulation and amplification on the signal, and convert the signal into an electromagnetic wave for radiation through the antenna 2. The terminal may establish a communication connection to the wearable device by using the wireless communication module 160. The terminal may obtain, through the wireless communication module 160, the first voice component captured by the wearable device by using the in-ear voice sensor, the second voice component captured by using the out-of-ear voice sensor, and the third voice component captured by using the bone vibration sensor.

For example, the GNSS in an embodiment of the application may include a GPS, a GLONASS, a BDS, a QZSS, an SBAS, and/or GALILEO.

The mobile phone implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and execute a program instruction to generate or change display information. The display 194 is configured to display an image, a video, and the like. The display 194 includes a display panel.

The mobile phone may implement a photographing function by using the ISP, the camera 193, the video codec, the GPU, the display 194, the application processor, and the like. The ISP may be configured to process data fed back by the camera 193. The camera 193 is configured to obtain a static image or a video. An optical image of an object is generated through the lens, and is projected onto a photosensitive element. The digital signal processor is configured to process a digital signal, and may process another digital signal in addition to the digital image signal. The video codec is configured to compress or decompress a digital video.

The NPU is a neural-network (NN) computing processor. The NPU quickly processes input information based on a structure of a biological neural network, for example, based on a transfer mode between human brain neurons; and may further continuously perform self-learning. The NPU may be used to implement applications such as intelligent cognition of the mobile phone, for example, image recognition, facial recognition, voice recognition, and text understanding.

The external memory interface 120 may be configured to be connected to an external memory card, for example, a micro SD card, to extend a storage capability of the mobile phone. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the mobile phone and data processing. The code stored in the internal memory 121 may be used to perform a voice control method provided in embodiments of this application. For example, when a user enters voice information to a wearable device, the wearable device captures a first voice component by using an in-ear voice sensor, captures a second voice component by using an out-of-ear voice sensor, and captures a third voice component by using a bone vibration sensor. The mobile phone obtains the first voice component, the second voice component, and the third voice component from the wearable device through a communication connection, performs voiceprint recognition on each of the first voice component, the second voice component, and the third voice component, and performs identity authentication on the user based on a first voiceprint recognition result of the first voice component, a second voiceprint recognition result of the second voice component, and a third voiceprint recognition result of the third voice component. If an identity authentication result of the user is that the user is a preset user, the mobile phone executes an operation instruction corresponding to the voice information.

The mobile phone may implement an audio function by using the audio module 170, the loudspeaker 170A, the receiver 170B, the microphone 170C, the headset jack 170D, the application processor, and the like. The terminal may establish a communication connection to the wearable device by using the wireless communication module 160. The terminal may obtain, through the wireless communication module 160, the first voice component captured by the wearable device by using the in-ear voice sensor, the second voice component captured by using the out-of-ear voice sensor, and the third voice component captured by using the bone vibration sensor.

The audio module 170 is configured to convert digital audio information into an analog audio signal for output, and is also configured to convert analog audio input into a digital audio signal. The loudspeaker 170A, also referred to as a "horn", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal. The headset jack 170D is configured to be connected to a wired headset. The headset jack 170D may be the USB port 130, or may be a 3.2 mm open mobile terminal platform (OMTP) standard interface or a cellular telecommunications industry association of the USA (CTIA) standard interface.

The button 190 includes a power button, a volume button, and the like. The button 190 may be a mechanical button, or may be a touch button. The mobile phone may receive key input, and generate key signal input related to a user setting and function control of the mobile phone. The motor 191 may generate a vibration prompt. The motor 191 may be configured to provide an incoming call vibration prompt and a touch vibration feedback. The indicator 192 may be an indicator, and may be configured to indicate a charging status and a power change, or may be configured to indicate a message, a missed call, a notification, and the like. The SIM card interface 195 is configured to be connected to a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The SIM card interface 195 may support a nano-SIM card, a micro-SIM card, a SIM card, and the like.

Although not shown in FIG. 1, the mobile phone 100 may further include a camera, a flash, a micro projection apparatus, a near field communication (NFC) apparatus, and the like. Details are not described herein.

A layered architecture, an event-driven architecture, a microcore architecture, a microservice architecture, or a cloud architecture may be used for a software system of the mobile phone. In an embodiment of the application, an Android system of a layered architecture is used as an example to describe a software structure of the mobile phone.

Figure 2:
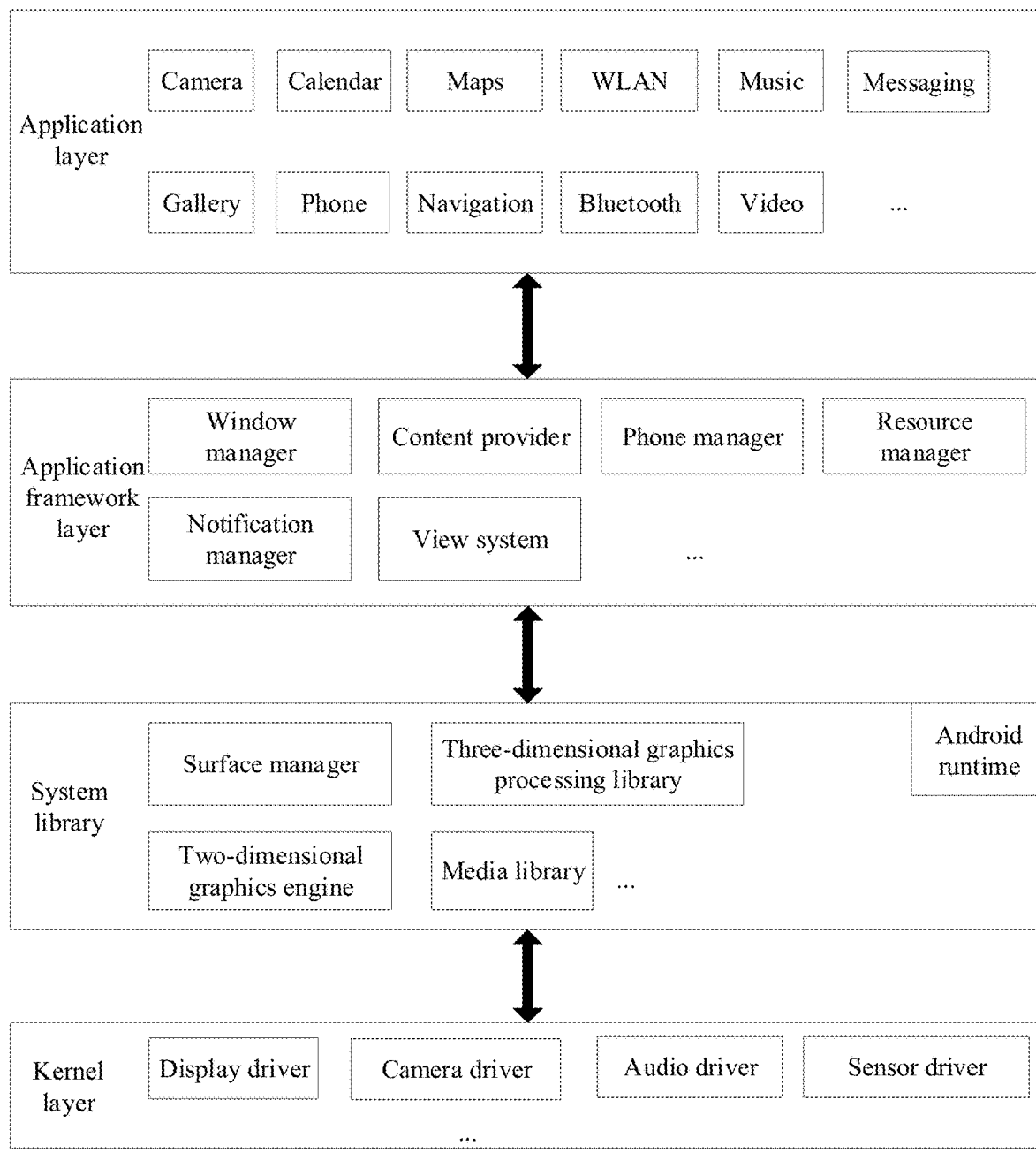
FIG. 2 is a schematic diagram of a software structure of a mobile phone according to an embodiment of this application.

FIG. 2 is a block diagram of a software structure of a mobile phone according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages. An application used for voiceprint recognition may be further included. The application used for voiceprint recognition may be built in a terminal, or may be downloaded from an external website.

The application framework layer provides an application programming interface (API) and a programming framework for an application at the application layer.

The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the mobile phone, for example, management of a call status (including answering, declining, or the like).

The resource manager provides various resources for the application, for example, a localized string, an icon, a picture, a layout file, and a video file.

The notification manager enables an application to display notification information in a status bar, and may be configured to convey a notification message. The notification manager may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, a prompt tone is produced, an electronic device vibrates, or an indicator blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage capturing.

The system library may include a plurality of functional modules, for example, a surface manager, a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, a static image file, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the mobile phone with reference to a scenario in which capturing and photographing are performed.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, a camera driver is started by invoking the kernel layer, and a static image or a video is captured through the camera 193.

The voice control method in embodiments of this application may be applied to the wearable device. In other words, the wearable device may perform the voice control method in embodiments of this application. The wearable device may be a device having a voice capturing function, for example, a wireless headset, a wired headset, smart glasses, a smart helmet, or a smart wristwatch. This is not limited in an embodiment of the application.

For example, the wearable device provided in an embodiment of the application may be a TWS (True Wireless Stereo, true wireless stereo) headset, and the TWS technology is based on development of a Bluetooth chip technology. Based on a working principle of the wearable device, the mobile phone is connected to a primary headset, and the primary headset is quickly connected to a secondary headset in a wireless manner. In this way, a left audio channel and a right audio channel are separately used.

With development of the TWS technology and an artificial intelligence technology, a TWS smart headset starts to play a role in the wireless connection field, the voice interaction field, the intelligent noise reduction field, the health monitoring field, the hearing enhancement/protection field, and the like. Noise reduction, hearing protection, intelligent translation, health monitoring, bone vibration ID, and anti-loss are trends of key technologies of a TWS headset.

Figure 3:
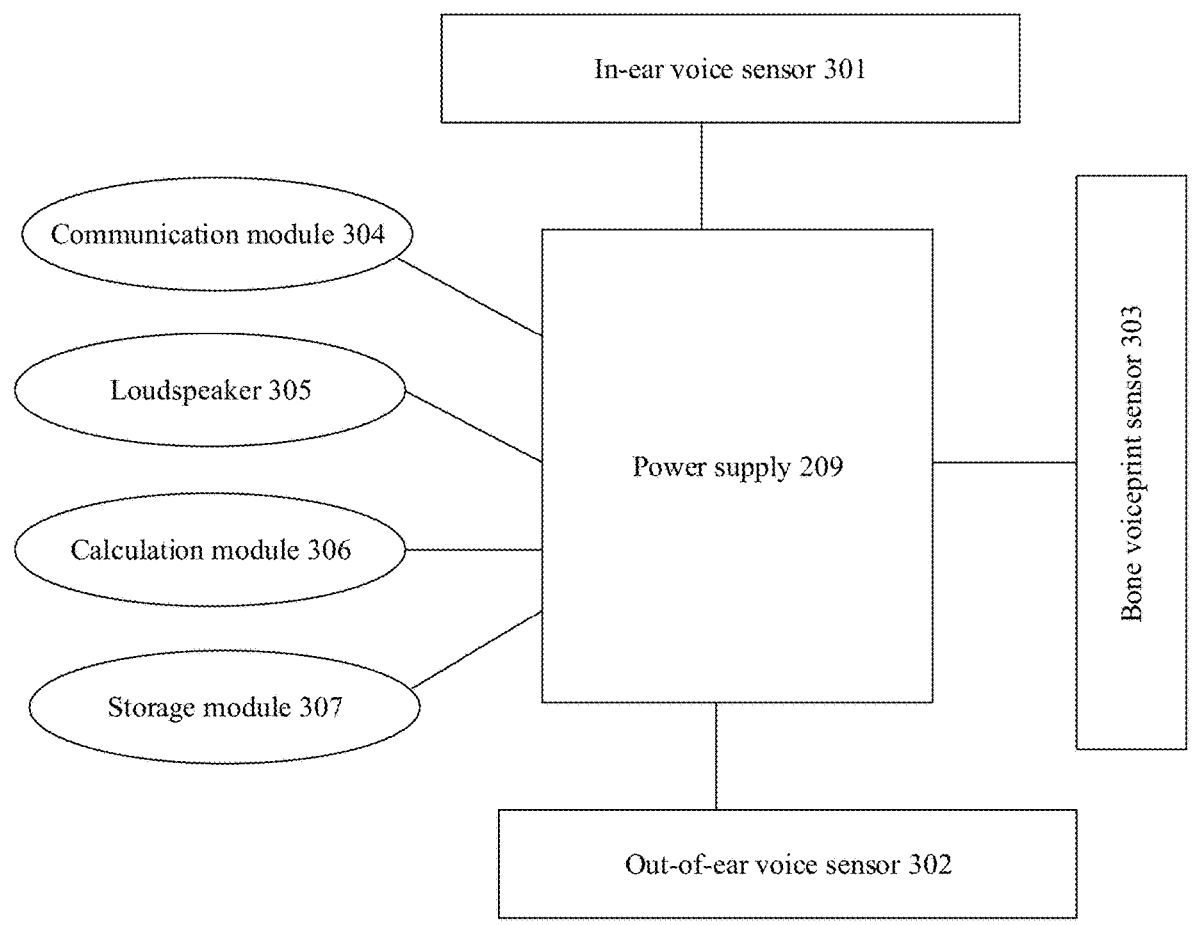
FIG. 3 is a schematic diagram of a structure of a wearable device according to an embodiment of this application.

FIG. 3 is a diagram of a structure of a wearable device. A wearable device 30 may include an in-ear voice sensor 301, an out-of-ear voice sensor 302, and a bone vibration sensor 303. The in-ear voice sensor 301 and the out-of-ear voice sensor each may be an air conduction microphone, and the bone vibration sensor may be a sensor capable of capturing a vibration signal generated when a user makes a sound, for example, a bone conduction microphone, an optical vibration sensor, an acceleration sensor, or an air conduction microphone. A manner in which the air conduction microphone captures voice information is transmitting, to the microphone through air, a vibration signal generated when a voice is made, capturing a voice signal, and converting the voice signal into an electrical signal. A manner in which the bone conduction microphone captures voice information is transmitting, to the microphone through a bone and slight vibration of a head and neck bone caused when a person speaks, a vibration signal generated when a voice is made, capturing a voice signal, and converting the voice signal into an electrical signal.

It can be understood that a voice control method provided in embodiments of this application needs to be applied to a wearable device having a voiceprint recognition function. In other words, the wearable device 30 needs to have the voiceprint recognition function.

The in-ear voice sensor 301 of the wearable device 30 provided in an embodiment of the application means that, when the wearable device is in a state of being used by the user, the in-ear voice sensor is located inside an ear canal of the user, or a sound detection direction of the in-ear voice sensor is an inside of an ear canal. The in-ear voice sensor is configured to capture a sound that is transmitted through vibration of external air and air in the ear canal when the user makes a sound, and the sound is an in-ear voice signal component. The out-of-ear voice sensor 302 means that, when the wearable device is in a state of being used by the user, the out-of-ear voice sensor is located outside the ear canal of the user, or a sound detection direction of the out-of-ear voice sensor is a direction other than the inside of the ear canal, that is, an entire external air direction. The out-of-ear voice sensor is exposed to an environment, and is configured to capture a sound that is made by the user and that is transmitted through vibration of external air. The sound is an out-of-ear voice signal component or an ambient sound component. The bone vibration sensor 303 means that, when the wearable device is in a state of being used by the user, the bone vibration sensor is in contact with skin of the user, and is configured to capture a vibration signal transmitted through a bone of the user, or is configured to capture a voice information component transmitted through bone vibration when the user makes a sound at a time. In an embodiment, for both an in-ear microphone and an out-of-ear microphone, a microphone with different directions, for example, a heart-shaped microphone, an omnidirectional microphone, or an 8-shaped microphone may be selected based on a location of the microphone, to obtain voice signals in different directions.

After the user wears a headset, an external auditory canal and a middle auditory canal form a closed cavity, and there is amplification effect, that is, cavity effect, for a sound in the cavity. Therefore, a sound captured by the in-ear voice sensor is clearer, and especially, there is obvious enhancement effect for a high-frequency sound signal; distortion caused when a high-frequency signal component of some voice information is lost when the bone vibration sensor captures voice information can be compensated for; and overall voiceprint capturing effect and voiceprint recognition accuracy of the headset can be improved, to improve user experience.

It can be understood that, when the in-ear voice sensor 301 picks up an in-ear voice signal, there is usually in-ear residual noise, and when the out-of-ear voice sensor 302 picks up an out-of-ear voice signal, there is usually out-of-ear noise.

In an embodiment of the application, when the user wears the wearable device 30 to speak, the wearable device 30 may not only capture, by using the in-ear voice sensor 301 and the out-of-ear voice sensor 302, voice information that is sent by the user and that is transmitted through air, but also capture, by using the bone vibration sensor 303, voice information that is sent by the user and that is transmitted through a bone.

It can be understood that there may be a plurality of in-ear voice sensors 301, out-of-ear voice sensors 302, and bone vibration sensors 303 in the wearable device 30. This is not limited in this application. The in-ear voice sensor 301, the out-of-ear voice sensor 302, and the bone vibration sensor 303 may be built in the wearable device 30.

Still as shown in FIG. 3, the wearable device 30 may further include components such as a communication module 304, a loudspeaker 305, a calculation module 306, a storage module 307, and a power supply 309.

When a terminal or a server performs the voice control method in embodiments of this application, the communication module 304 can establish a communication connection to the terminal or the server. The communication module 304 may include a communication interface. The communication interface is in a wired manner or a wireless manner, and the wireless manner may be a Bluetooth or Wi-Fi manner. The communication module 304 may be configured to transfer, to the terminal or the server, a first voice component captured by the wearable device 30 by using the in-ear voice sensor 301, a second voice component captured by using the out-of-ear voice sensor 302, and a third voice component captured by using the bone vibration sensor 303.

When the wearable device 30 performs the voice control method in embodiments of this application, the calculation module 306 can perform the voice control method provided in embodiments of this application. When the user enters voice information to the wearable device, the wearable device 30 captures a first voice component by using the in-ear voice sensor 301, captures a second voice component by using the out-of-ear voice sensor 302, and captures a third voice component by using the bone vibration sensor 303; performs voiceprint recognition on each of the first voice component, the second voice component, and the third voice component; and performs identity authentication on the user based on a first voiceprint recognition result of the first voice component, a second voiceprint recognition result of the second voice component, and a third voiceprint recognition result of the third voice component. If an identity authentication result of the user is that the user is a preset user, the wearable device executes an operation instruction corresponding to the voice information.

The storage module 307 is configured to store application code for performing the method in an embodiment of the application, and the calculation module 306 controls execution.

The code stored in the storage module 307 may be used to perform the voice control method provided in embodiments of this application. For example, when the user enters voice information to the wearable device, the wearable device 30 captures a first voice component by using the in-ear voice sensor 301, captures a second voice component by using the out-of-ear voice sensor 302, and captures a third voice component by using the bone vibration sensor 303; performs voiceprint recognition on each of the first voice component, the second voice component, and the third voice component; and performs identity authentication on the user based on a first voiceprint recognition result of the first voice component, a second voiceprint recognition result of the second voice component, and a third voiceprint recognition result of the third voice component. If an identity authentication result of the user is that the user is a preset user, the wearable device executes an operation instruction corresponding to the voice information.

It can be understood that the microphone and the bone vibration sensor may be randomly combined. The wearable device 30 may further include a pressure sensor, an acceleration sensor, an optical sensor, and the like. The wearable device 30 may have more or fewer components than those shown in FIG. 3, may combine two or more components, or may have a different component configuration. The various components shown in FIG. 3 may be implemented in hardware, software, or a combination of hardware and software including one or more signal processing or application-specific integrated circuits.

Figure 4:
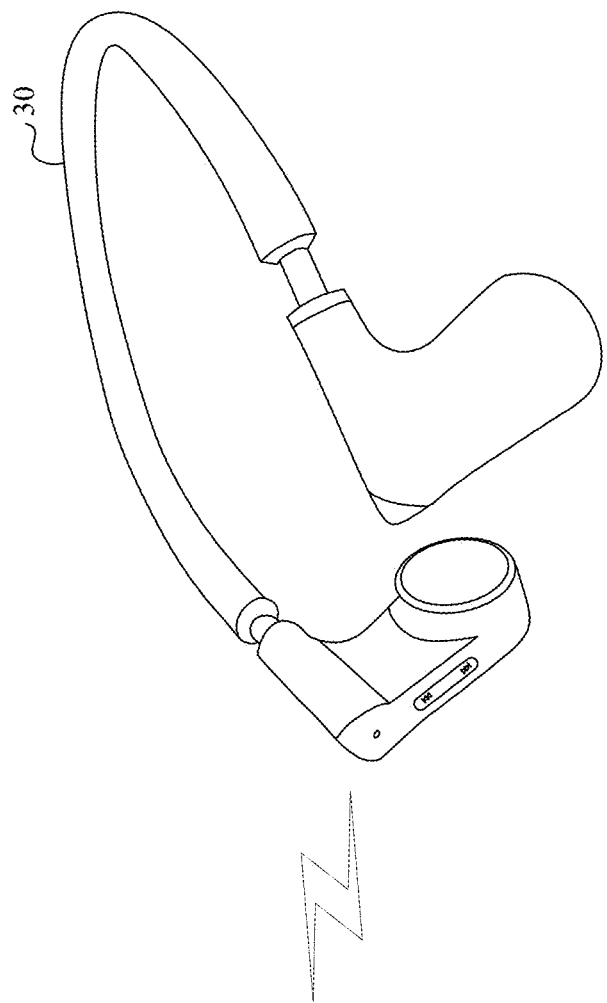
FIG. 4 is a schematic diagram of a voice control system according to an embodiment of this application.
Figure 4:
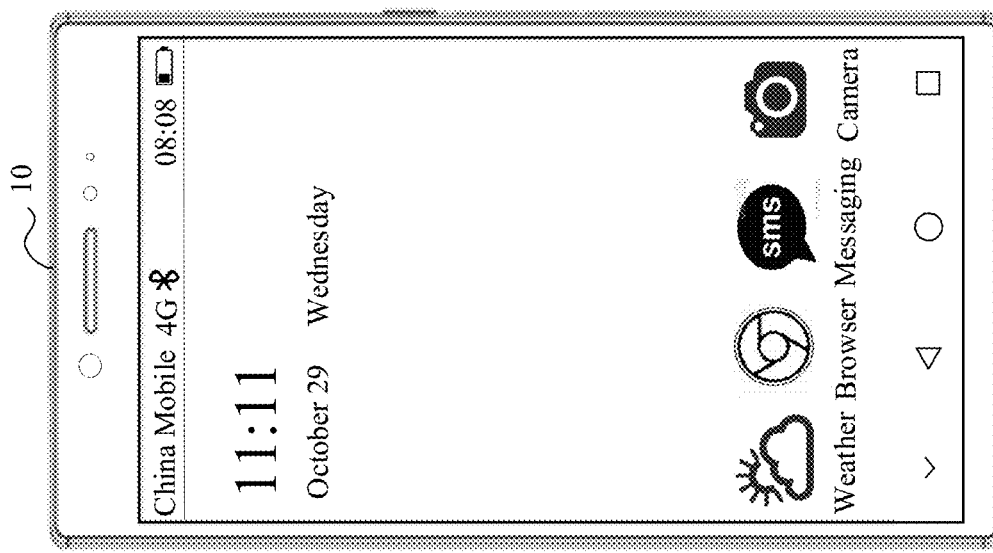

The voice control method provided in embodiments of this application may be applied to a voice control system including the wearable device 30 and a terminal 10. The voice control system is shown in FIG. 4. In the voice control system, when the user enters voice information to the wearable device, the wearable device 30 may separately capture a first voice component by using the in-ear voice sensor 301, capture a second voice component by using the out-of-ear voice sensor 302, and capture a third voice component by using the bone vibration sensor 303. The terminal 10 obtains the first voice component, the second voice component, and the third voice component from the wearable device; performs voiceprint recognition on the first voice component, the second voice component, and the third voice component; and performs identity authentication on the user based on a first voiceprint recognition result of the first voice component, a second voiceprint recognition result of the second voice component, and a third voiceprint recognition result of the third voice component. If an identity authentication result of the user is that the user is a preset user, the terminal 10 executes an operation instruction corresponding to the voice information.

The voice control method in embodiments of this application may be further applied to the server. In other words, the server may perform the voice control method in embodiments of this application.

The server may be a desktop server, a rack server, a cabinet server, a blade server, or another type of server; or the server may be a cloud server such as a public cloud or a private cloud. This is not limited in an embodiment of the application.

Figure 5:
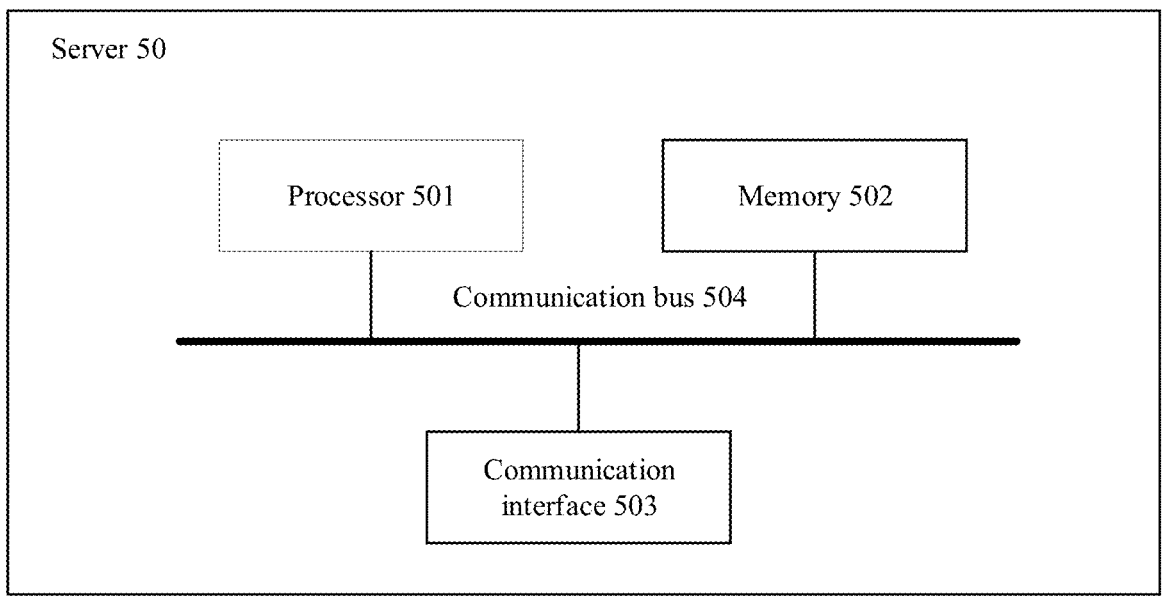
FIG. 5 is a schematic diagram of a structure of a server according to an embodiment of this application.

FIG. 5 is a diagram of a structure of a server. A server 50 includes at least one processor 501, at least one memory 502, and at least one communication interface 503. The processor 501, the memory 502, and the communication interface 503 are connected through communication bus 504 and communicate with each other.

The processor 501 may be a general-purpose central processing unit (CPU), a microprocessor, an application-specific integrated circuit (ASIC), or one or more integrated circuits for controlling execution of the foregoing solution program.

The memory 502 may be a read-only memory (ROM) or another type of static storage device that may store static information and instructions, or a random access memory (RAM) or another type of dynamic storage device that may store information and instructions; or may be an electrically erasable programmable read-only memory (EEPROM), a compact disc read-only memory (CD-ROM), or another compact disc storage, an optical disc storage (including a compact disc, a laser disc, an optical disc, a digital versatile disc, and a Blu-ray disc, or the like), a disk storage medium or another disk storage device, or any other medium that can be used to carry or store expected program code in an instruction or data structure form and that can be accessed by a computer. However, the memory 502 is not limited thereto. The memory may exist independently, and is connected to the processor through the bus. The memory may alternatively be integrated with the processor.

The memory 502 is configured to store application code for performing a method in embodiments of this application, and the processor 501 controls execution.

The code stored in the memory 502 may be used to perform a voice control method provided in embodiments of this application. For example, when a user enters voice information to a wearable device, the wearable device captures a first voice component by using an in-ear voice sensor, captures a second voice component by using an out-of-ear voice sensor, and captures a third voice component by using a bone vibration sensor. The server obtains the first voice component, the second voice component, and the third voice component from the wearable device through a communication connection, performs voiceprint recognition on each of the first voice component, the second voice component, and the third voice component, and performs identity authentication on the user based on a first voiceprint recognition result of the first voice component, a second voiceprint recognition result of the second voice component, and a third voiceprint recognition result of the third voice component. If an identity authentication result of the user is that the user is a preset user, the server executes an operation instruction corresponding to the voice information.

The communication interface 503 is configured to communicate with another device or a communication network, for example, the Ethernet, a radio access network (RAN), or a wireless local area network (WLAN).

With reference to FIG. 1 to FIG. 5, an example in which the wearable device is a Bluetooth headset and the terminal is a mobile phone is used to describe an implementation of applying the voice control method in this application to the terminal. In the method, the voice information of the user is first obtained. The voice information includes the first voice component, the second voice component, and the third voice component. In an embodiment of the application, the user may enter the voice information to the Bluetooth headset when wearing the Bluetooth headset. In this case, the Bluetooth headset may capture, based on the voice information entered by the user, the first voice component by using the in-ear voice sensor, capture the second voice component by using the out-of-ear voice sensor, and capture the third voice component by using the bone vibration sensor.

The Bluetooth headset obtains the first voice component, the second voice component, and the third voice component from the voice information. The mobile phone obtains the first voice component, the second voice component, and the third voice component from the Bluetooth headset through a Bluetooth connection to the Bluetooth headset. In an embodiment, the mobile phone may perform keyword detection on the voice information entered by the user to the Bluetooth headset, or the mobile phone may detect user input. In an embodiment, when the voice information includes a preset keyword, voiceprint recognition is performed on each of the first voice component, the second voice component, and the third voice component. When a preset operation entered by the user is received, voiceprint recognition is performed on each of the first voice component, the second voice component, and the third voice component. The user input may be input performed by the user on the mobile phone by using a touchscreen or a button. For example, the user taps an unlock button of the mobile phone. In an embodiment, before performing keyword detection on the voice information or detecting the user input, the mobile phone may further obtain a worn state detection result from the Bluetooth headset. In an embodiment, when the worn state detection result is that the wearable device is in a worn state, the mobile phone performs keyword detection on the voice information, or detects the user input.

After performing voiceprint recognition on each of the first voice component, the second voice component, and the third voice component, the mobile phone obtains the first voiceprint recognition result corresponding to the first voice component, the second voiceprint recognition result corresponding to the second voice component, and the third voiceprint recognition result corresponding to the third voice component.

When a first voiceprint feature matches a first registered voiceprint feature, a second voiceprint feature matches a second registered voiceprint feature, and a third voiceprint feature matches a third registered voiceprint feature, it indicates that the voice information captured by the Bluetooth headset in this case is entered by the preset user. For example, the mobile phone may calculate, based on an algorithm, a first matching degree between the first voiceprint feature and the first registered voiceprint feature, a second matching degree between the second voiceprint feature and the second registered voiceprint feature, and a third matching degree between the third voiceprint feature and the third registered voiceprint feature. A higher matching degree indicates that a voiceprint feature better matches a corresponding registered voiceprint feature, and indicates a higher probability that the speaking user is a preset user. For example, when an average value of the first matching degree, the second matching degree, and the third matching degree is greater than 80 points, the mobile phone may determine that the first voiceprint feature matches the first registered voiceprint feature, the second voiceprint feature matches the second registered voiceprint feature, and the third voiceprint feature matches the third registered voiceprint feature. Alternatively, when the first matching degree, the second matching degree, and the third matching degree each are greater than 85 points, the mobile phone may determine that the first voiceprint feature matches the first registered voiceprint feature, the second voiceprint feature matches the second registered voiceprint feature, and the third voiceprint feature matches the third registered voiceprint feature. The first registered voiceprint feature is obtained by performing feature extraction by using a first voiceprint model, and the first registered voiceprint feature indicates a voiceprint feature that is of the preset user and that is captured by the in-ear voice sensor. The second registered voiceprint feature is obtained by performing feature extraction by using a second voiceprint model, and the second registered voiceprint feature indicates a voiceprint feature that is of the preset user and that is captured by the out-of-ear voice sensor. The third registered voiceprint feature is obtained by performing feature extraction by using a third voiceprint model, and the third registered voiceprint feature indicates the voiceprint feature that is of the preset user and that is captured by the bone vibration sensor.

It can be understood that herein, an algorithm type is not limited, and a determining condition is not limited, provided that a technical effect of an embodiment of the application can be achieved. Further, the mobile phone may execute the operation instruction corresponding to the voice information, for example, an unlocking instruction, a payment instruction, a power-off instruction, an application starting instruction, or a call instruction. In this way, the mobile phone can perform a corresponding operation based on the operation instruction, so that the user can control the mobile phone by using a voice. It can be understood that a condition for identity authentication is not limited. For example, when the first matching degree, the second matching degree, and the third matching degree each are greater than a threshold, it may be considered that identity authentication succeeds, and the sound making user is a preset user; or when a fusion matching degree obtained by performing matching degree fusion on the first matching degree, the second matching degree, and the third matching degree in a manner is greater than a threshold, it may be considered that identity authentication succeeds, and the sound making user is a preset user. Identity authentication in an embodiment of the application is to obtain the identity information of the user, and determine whether the identity information of the user matches preset identity information. If the identity information matches the preset identity information, it is considered that authentication succeeds, or if the identity information does not match the preset identity information, it is considered that authentication fails.

The preset user is a user who can pass an identity authentication measure preset by the mobile phone. For example, when the identity authentication measure preset by the terminal is entering a password, fingerprint recognition, and voiceprint recognition, a user who successfully enters the password or whose fingerprint information and registered voiceprint feature whose user identity authentication succeeds are prestored in the terminal may be considered as a preset user of the terminal. Certainly, one terminal may have one or more preset users, and any user other than the preset user may be considered as an authorized user of the terminal. After passing a identity authentication measure, the unauthorized user may also be changed to a preset user. This is not limited in an embodiment of the application.

In an embodiment, the first registered voiceprint feature is obtained by performing feature extraction by using the first voiceprint model, and the first registered voiceprint feature indicates the voiceprint feature that is of the preset user and that is captured by the in-ear voice sensor. The second registered voiceprint feature is obtained by performing feature extraction by using the second voiceprint model, and the second registered voiceprint feature indicates the voiceprint feature that is of the preset user and that is captured by the out-of-ear voice sensor. The third registered voiceprint feature is obtained by performing feature extraction by using the third voiceprint model, and the third registered voiceprint feature indicates the voiceprint feature that is of the preset user and that is captured by the bone vibration sensor.

In an embodiment, the algorithm for calculating the matching degree may be calculating a similarity. The mobile phone performs feature extraction on the first voice component to obtain the first voiceprint feature, separately calculates a first similarity between the first voiceprint feature and the prestored first registered voiceprint feature of the preset user, a second similarity between the second voiceprint feature and the prestored second registered voiceprint feature of the preset user, and a third similarity between the third voiceprint feature and the prestored third registered voiceprint feature of the preset user, and performs identity authentication on the user based on the first similarity, the second similarity, and the third similarity.

In an embodiment, a manner of performing identity authentication on the user may be as follows: The mobile phone separately determines a first fusion coefficient corresponding to the first similarity, a second fusion coefficient corresponding to the second similarity, and a third fusion coefficient corresponding to the third similarity based on a decibel of an ambient sound and a playing volume of the wearable device; and fuses the first similarity, the second similarity, and the third similarity based on the first fusion coefficient, the second fusion coefficient, and the third fusion coefficient, to obtain a fused similarity score. If the fused similarity score is greater than a first threshold, the mobile phone determines that the user who enters the voice information to the Bluetooth headset is a preset user.

In an embodiment, the decibel of the ambient sound is detected by a sound pressure sensor of the Bluetooth headset and sent to the mobile phone, and the playing volume may be obtained by detecting a playing signal by a loudspeaker of the Bluetooth headset and sent to the mobile phone, or may be obtained by the mobile phone by invoking data of the mobile phone, that is, obtained by using a volume interface program interface of an underlying system.

In an embodiment, the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value. To be specific, when the sum of the first fusion coefficient, the second fusion coefficient, and the third fusion coefficient is a preset fixed value, a larger decibel of the ambient sound indicates a smaller second fusion coefficient. In this case, correspondingly, the first fusion coefficient and the third fusion coefficient are adaptively increased, to maintain the sum of the first fusion coefficient, the second fusion coefficient, and the third fusion coefficient unchanged. A higher playing volume indicates a smaller first fusion coefficient and a smaller third fusion coefficient. In this case, correspondingly, the second fusion coefficient is adaptively increased, to maintain the sum of the first fusion coefficient, the second fusion coefficient, and the third fusion coefficient unchanged. It can be understood that, recognition accuracy in different application scenarios (a case in which ambient noise is large or music is played by using a headset) can be considered based on the variable fusion coefficient.

After the mobile phone determines that the user who enters the voice information to the Bluetooth headset is a preset user, the mobile phone may automatically execute the operation instruction corresponding to the voice information, for example, a mobile phone unlocking operation or a payment confirmation operation.

It can be learned that, in an embodiment of the application, when the user enters the voice information to the wearable device to control the terminal, the wearable device may capture voice information generated in an ear canal when the user makes a sound, and voice information and bone vibration information that are generated outside the ear canal. In this case, three channels of voice information (that is, the first voice component, the second voice component, and the third voice component) are generated in the wearable device. In this way, the terminal (or the wearable device, or the server) may perform voiceprint recognition on each of the three channels of voice information. When voiceprint recognition results of the three channels of voice information all match registered voiceprint features of the preset user, it may be determined that the user who enters the voice information currently is a preset user, or when a fusion result obtained after weighted fusion is performed on voiceprint recognition results of the three channels of voice information is greater than a threshold, it may be determined that the user who enters the voice information currently is a preset user. It is clear that, compared with a voiceprint recognition process of one channel of voice information or a voiceprint recognition process of two channels of voice information, a triple voiceprint recognition process of the three channels of voice information can significantly improve accuracy and security of user identity authentication. In particular, one microphone can be added to an ear, to resolve a problem that a high-frequency signal of a voice signal captured by the bone vibration sensor is lost in a voiceprint recognition process of two channels of voice information of the out-of-ear voice sensor and the bone vibration sensor.

In addition, the wearable device can capture, through bone conduction, the voice information entered by the user only after the user wears the wearable device. Therefore, when voiceprint recognition performed on the voice information captured by the wearable device through bone conduction can succeed, it indicates that the voice information is generated when the preset user wearing the wearable device makes a sound, to avoid a case in which the unauthorized user maliciously controls a terminal of the preset user based on a recording of the preset user.

For ease of understanding, the following describes, with reference to the accompanying drawings, a voice control method provided in embodiments of this application. In the following embodiments, descriptions are provided by using an example in which a mobile phone serves as a terminal and a Bluetooth headset serves as a wearable device.

First, a voiceprint recognition technology is briefly described.

Figure 6:
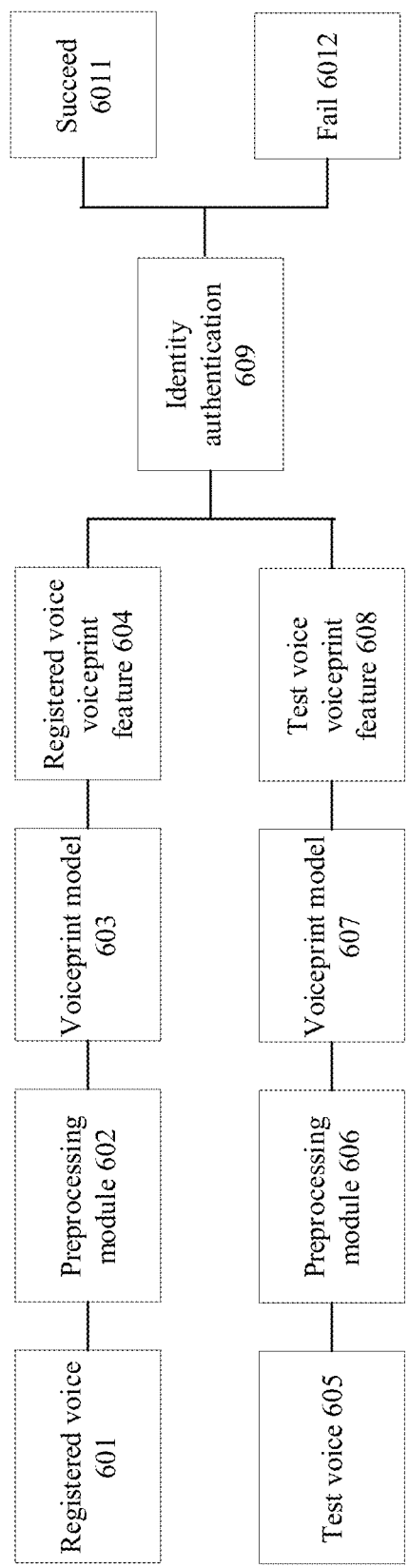
FIG. 6 is a schematic flowchart of voiceprint recognition according to an embodiment of this application.

In an actual application, the voiceprint recognition technology usually includes two procedures: a registration procedure and a verification procedure. A general voiceprint recognition application procedure is shown in FIG. 6. In the registration procedure, a registered voice 601 is captured, is preprocessed by a preprocessing module 602, and is entered to a pre-trained voiceprint model 603 for feature extraction, to obtain a registered voice voiceprint feature 604. The registered voiceprint feature may also be understood as a registered voiceprint feature of a preset user. It can be understood that the registered voice may be extracted by different types of sensors, for example, an out-of-ear voice sensor, an in-ear voice sensor, or a bone vibration sensor. The voiceprint model 603 is obtained in advance through training performed based on the training data. The voiceprint model 603 may be built in the terminal before the terminal is delivered from a factory, or may be trained by an application instructing a user. A training method may be a method in the conventional technology. This is not limited in this application. In the verification procedure, a test voice 605 of a speaking user in a voiceprint recognition process is captured, is preprocessed by the preprocessing module 606, and is entered to a pre-trained voiceprint model 607 for feature extraction, to obtain a test voice voiceprint feature 608. The test voiceprint feature may also be understood as a registered voiceprint feature of the preset user. After identity authentication 609 is performed by performing voiceprint recognition based on the registered voice voiceprint feature 604 and the test voice voiceprint feature 608, voiceprint recognition results are obtained: identity authentication succeeds 6010 and identity authentication fails 6011. The identity authentication succeeding 6010 means that a sound making user of the test voice 605 and a sound making user of the registered voice 601 are a same person. In other words, the sound making user of the test voice 605 is a preset user. The identity authentication failing 6011 means that a speaking user of the test voice 605 and a speaking user of the registered voice 601 are not a same person. In other words, the speaking user of the test voice 605 is an unauthorized user. It can be understood that, in different application scenarios, sound preprocessing, feature extraction, and a training process of a voiceprint model varies to different degrees. In addition, the preprocessing module is an optional module, and preprocessing includes filtering, noise reduction, or enhancement of a voice signal. This is not limited in this application.

Figure 7:
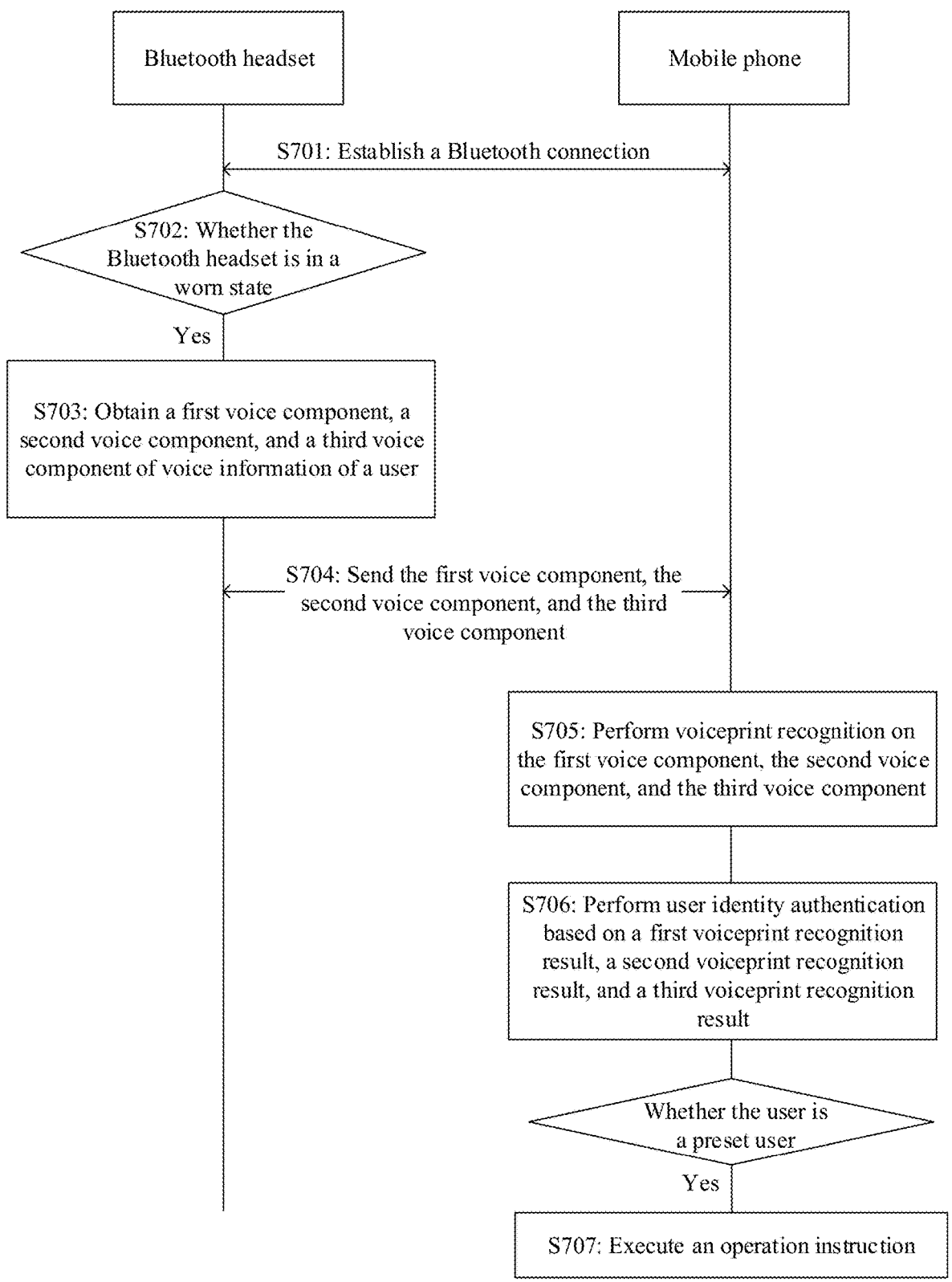
FIG. 7 is a schematic diagram of a voice control method according to an embodiment of this application.

FIG. 7 is a schematic flowchart of a voice control method according to an embodiment of this application by using an example in which a terminal is a mobile phone and a wearable device is a Bluetooth headset. The Bluetooth headset includes an in-ear voice sensor, an out-of-ear voice sensor, and a bone vibration sensor. As shown in FIG. 7, the voice control method may include the following operations.

S701: The mobile phone establishes a connection to the Bluetooth headset.

A connection manner may be a Bluetooth connection, a Wi-Fi connection, or a wired connection. If the mobile phone establishes a Bluetooth connection to the Bluetooth headset, when a user expects to use the Bluetooth headset, the user may enable a Bluetooth function of the Bluetooth headset. In this case, the Bluetooth headset may send pairing broadcast to an outside. If a Bluetooth function of the mobile phone is not enabled, the user needs to enable the Bluetooth function of the mobile phone. If the Bluetooth function of the mobile phone is enabled, the mobile phone may receive the pairing broadcast and prompt the user with a case in which a related Bluetooth device is found through scanning. After the user selects the Bluetooth headset on the mobile phone, the mobile phone may be paired with the Bluetooth headset and establish the Bluetooth connection. Subsequently, the mobile phone and the Bluetooth headset may communicate with each other through the Bluetooth connection. Certainly, if the mobile phone is successfully paired with the Bluetooth headset before a current Bluetooth connection is established, the mobile phone may automatically establish the Bluetooth connection to the Bluetooth headset found through scanning.

In addition, if the user expects that a used headset has a Wi-Fi function, the user may operate the mobile phone to establish a Wi-Fi connection to the headset. Alternatively, if the user expects that a used headset is a wired headset, the user inserts a headset cable plug into a corresponding headset jack of the mobile phone to establish a wired connection. This is not limited in an embodiment of the application.

S702 (optional): The Bluetooth headset detects whether the Bluetooth headset is in a worn state.

In a wear detection method, the worn state of the user may be sensed based on an optical sensing principle in a photoelectric detection manner. When the user wears the headset, light detected by a photoelectric sensor inside the headset is blocked, and a switch control signal is output, to determine that the user is in a headset worn state.

In an embodiment, an optical proximity sensor and an acceleration sensor may be disposed in the Bluetooth headset. The optical proximity sensor is disposed on a side in contact with the user when the user wears the Bluetooth headset. The optical proximity sensor and the acceleration sensor may be periodically enabled to obtain a currently detected measurement value.

After the user wears the Bluetooth headset, light emitted into the optical proximity sensor is blocked. Therefore, when light intensity detected by the optical proximity sensor is less than a preset light intensity threshold, the Bluetooth headset may determine that the Bluetooth headset is in the worn state currently. In addition, after the user wears the Bluetooth headset, the Bluetooth headset may move with the user. Therefore, when an acceleration value detected by the acceleration sensor is greater than a preset acceleration threshold, the Bluetooth headset may determine that the Bluetooth headset is in the worn state currently. Alternatively, when light intensity detected by the optical proximity sensor is less than a preset light intensity threshold, if it is detected that an acceleration value detected by the acceleration sensor currently is greater than a preset acceleration threshold, the Bluetooth headset may determine that the Bluetooth headset is in the worn state currently.

Further, because a sensor, for example, a bone vibration sensor or an optical vibration sensor, that captures voice information through bone conduction is further disposed in the Bluetooth headset, in an embodiment, the Bluetooth headset may further capture, by using the bone vibration sensor, a vibration signal generated in a current environment. When the Bluetooth headset is in the worn state, the Bluetooth headset is in direct contact with the user. Therefore, the vibration signal captured by the bone vibration sensor is stronger than a vibration signal captured in an unworn state. In this case, if energy of the vibration signal captured by the bone vibration sensor is greater than an energy threshold, the Bluetooth headset may determine that the Bluetooth headset is in the worn state. Alternatively, because spectrum features such as a harmonic and resonance in a vibration signal captured when the user wears the Bluetooth headset are significantly different from those in a vibration signal captured when the user does not wear the Bluetooth headset, if the vibration signal captured by the bone vibration sensor satisfies a preset spectrum feature, the Bluetooth headset may determine that the Bluetooth headset is in the worn state. For both of the two cases, it can be understood as that a worn state detection result of the user passes. This can reduce a probability that the Bluetooth headset cannot accurately detect the worn state by using the optical proximity sensor or the acceleration sensor in a scenario in which the user puts the Bluetooth headset into a pocket, and the like.

The energy threshold or the preset spectrum feature may be obtained through statistics capturing after various vibration signals generated through sound making, movement, or the like after a large quantity of user wears the Bluetooth headset are captured, and is clearly different from an energy or a spectrum feature of a voice signal detected by the bone vibration sensor when the user does not wear the Bluetooth headset. In addition, because power consumption of a voice sensor (for example, an air conduction microphone) outside the Bluetooth headset is usually high, before the Bluetooth headset detects that the Bluetooth headset is in the worn state currently, the in-ear voice sensor, the out-of-ear voice sensor, and/or the bone vibration sensor do/does not need to be enabled. After detecting that the Bluetooth headset is currently in the worn state, the Bluetooth headset may enable the in-ear voice sensor, the out-of-ear voice sensor, and/or the bone vibration sensor to capture voice information generated when the user makes a sound, so as to reduce power consumption of the Bluetooth headset.

After the Bluetooth headset detects that the Bluetooth headset is in the worn state currently, or after the worn state detection result is that the wearable device is in a worn state, operations S703 to S707 may continue to be performed; and before the Bluetooth headset detects that the Bluetooth headset is in the worn state, or before the worn state detection result is that the wearable device is in a worn state, the Bluetooth headset may enter a sleep state, and until the Bluetooth headset detects that the Bluetooth headset is in the worn state currently, operations S703 to S707 may continue to be performed. In other words, only when it is detected that the user wears the Bluetooth headset, that is, the user has an intention to use the Bluetooth headset, the Bluetooth headset can trigger a process in which the Bluetooth headset performs capturing to obtain voice information entered by the user, a voiceprint recognition process, or the like, to reduce power consumption of the Bluetooth headset. Certainly, operation S702 is optional. To be specific, regardless of whether the user wears the Bluetooth headset, the Bluetooth headset may continue to perform operations S703 to S707. This is not limited in an embodiment of the application.

In an embodiment, if the Bluetooth headset has captured a voice signal before detecting whether the Bluetooth headset is in the worn state, after the Bluetooth headset detects that the Bluetooth headset is in the worn state currently, or after the worn state detection result is that the wearable device is in a worn state, the voice signal captured by the Bluetooth headset is stored and operations S703 to S707 continue to be performed; or when the Bluetooth headset does not detect that the Bluetooth headset is in the worn state currently, or after the worn state detection result does not pass, the Bluetooth headset deletes the just captured voice signal.

S703: If the Bluetooth headset is in the worn state, the Bluetooth headset performs capturing by using the in-ear voice sensor, to obtain a first voice component of the voice information entered by the user, captures a second voice component of the voice information by using the out-of-ear voice sensor, and captures a third voice component of the voice information by using the bone vibration sensor.

When determining that the Bluetooth headset is in the worn state, the Bluetooth headset may start a voice detection module, to perform capturing by using the in-ear voice sensor, the out-of-ear voice sensor, and the bone vibration sensor, to obtain the voice information entered by the user, so as to obtain the first voice component, the second voice component, and the third voice component of the voice information. For example, the in-ear voice sensor and the out-of-ear voice sensor each are an air conduction microphone, and the bone vibration sensor is a bone conduction microphone. In a process of using the Bluetooth headset, the user may enter voice information "Hey Celia, use WeChat Pay". In this case, because the air conduction microphone is exposed to air, the Bluetooth headset may receive, by using the air conduction microphone, a vibration signal (that is, the first voice component, the second voice component, and the third voice component of the voice information) generated through air vibration after the user makes a sound. In addition, because the bone conduction microphone can be in contact with an ear bone of the user through skin, the Bluetooth headset may receive, by using the bone conduction microphone, a vibration signal (that is, the third voice component of the voice information) generated through vibration of the ear bone and the skin after the user makes a sound.

Figure 8:
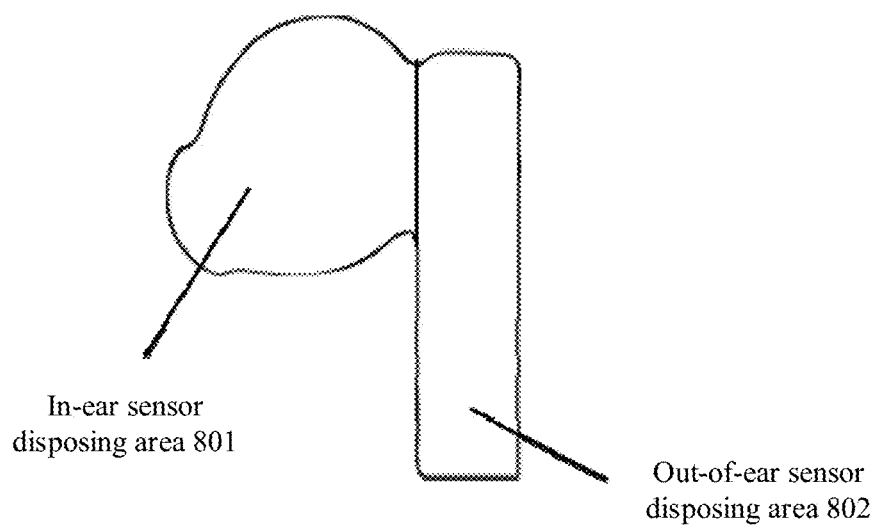
FIG. 8 is a schematic diagram of a sensor disposing area according to an embodiment of this application.

FIG. 8 is a schematic diagram of a sensor disposing area. The Bluetooth headset provided in an embodiment of the application includes the in-ear voice sensor, the out-of-ear voice sensor, and the bone vibration sensor. The in-ear voice sensor means that, when the headset is in a state of being used by the user, the in-ear voice sensor is located inside an ear canal of the user, or a sound detection direction of the in-ear voice sensor is an inside of an ear canal, and the in-ear voice sensor is disposed in an in-ear voice sensor disposing area 801. The in-ear voice sensor is configured to capture a sound that is transmitted through vibration of external air and air in the ear canal when the user makes a sound, and the sound is an in-ear voice signal component. The out-of-ear voice sensor means that, when the headset is in a state of being used by the user, the out-of-ear voice sensor is located outside the ear canal of the user, or a sound detection direction of the out-of-ear voice sensor is a direction other than the inside of the ear canal, that is, an entire external air direction, and the out-of-ear voice sensor is disposed in an out-of-ear voice sensor disposing area 802. The out-of-ear voice sensor is exposed to an environment, and is configured to capture a sound that is made by the user and that is transmitted through vibration of external air. The sound is an out-of-ear voice signal component or an ambient sound component. The bone vibration sensor means that, when the headset is in a state of being used by the user, the bone vibration sensor is in contact with skin of the user, and is configured to capture a vibration signal transmitted through a bone of the user, or is configured to capture a voice information component transmitted through bone vibration when the user makes a sound at a time. A disposing area of the bone vibration sensor is not limited, provided that bone vibration of the user can be detected when the user wears the headset. It can be understood that the in-ear voice sensor may be disposed at any location in the area 801, and the out-of-ear voice sensor may be disposed at any location in the area 802. This is not limited in this application. It should be noted that an area division manner in FIG. 8 is merely an example, the area division manner actually may be any manner, provided that a sound inside the ear canal can be detected at a location at which the in-ear voice sensor is disposed, and a sound in an external air direction can be detected at a location in which the out-of-ear voice sensor is disposed.

In some embodiments of this application, after detecting the voice information entered by the user, the Bluetooth headset may further distinguish a voice signal and background noise in the voice information based on a VAD (voice activity detection, voice activity detection) algorithm. In an embodiment, the Bluetooth headset may enter each of the first voice component, the second voice component, and the third voice component of the voice information to the corresponding VAD algorithm, to obtain a first VAD value corresponding to the first voice component, a second VAD value corresponding to the second voice component, and a third VAD value corresponding to the third voice component. A VAD value may indicate whether the voice information is a normal voice signal of the speaker or a noise signal. For example, the VAD value may be set to be in a range from 0 to 100. When the VAD value is greater than a VAD threshold, it may indicate that the voice information is a normal voice signal of the speaker, or when the VAD value is less than a VAD threshold, it may indicate that the voice information is a noise signal. For another example, the VAD value may be set to 0 or 1. When the VAD value is 1, it indicates that the voice information is a normal voice signal of the speaker, or when the VAD value is 0, it indicates that the voice information is a noise signal.

In this case, the Bluetooth headset may determine, based on the three VAD values of the first VAD value, the second VAD value, and the third VAD value, whether the voice information is a noise signal. For example, when the first VAD value, the second VAD value, and the third VAD value each are 1, the Bluetooth headset may determine that the voice information is not a noise signal, but is a normal voice signal of the speaker. For another example, when the first VAD value, the second VAD value, and the third VAD value each are greater than a preset value, the Bluetooth headset may determine that the voice information is not a noise signal, but is a normal voice signal of the speaker.

In addition, when the third VAD value is 1 or the third VAD value is greater than the preset value, it may indicate, to some extent, that currently captured voice information is sent by the speaker. Therefore, the Bluetooth headset may alternatively determine, based on only the third VAD value, whether the voice information is a noise signal. It can be understood that, in some cases, the Bluetooth headset may alternatively determine, based on only the first VAD value or the second VAD value, whether the voice information is a noise signal, and the Bluetooth headset may alternatively determine, based on any two of the first VAD value, the second VAD value, and the third VAD value, whether the voice information is a noise signal.

Voice activity detection is performed on each of the first voice component, the second voice component, and the third voice component. If the Bluetooth headset determines that the voice information is a noise signal, the Bluetooth headset may discard the voice information. If the Bluetooth headset determines that the voice information is not a noise signal, the Bluetooth headset may continue to perform operations S704 to S707. In other words, only when the user enters valid voice information to the Bluetooth headset, the Bluetooth headset is triggered to perform a subsequent process such as voiceprint recognition, to reduce power consumption of the Bluetooth headset.

In addition, after obtaining the first VAD value, the second VAD value, and the third VAD value respectively corresponding to the first voice component, the second voice component, and the third voice component, the Bluetooth headset may further calculate each noise value of the voice information based on a noise estimation algorithm (for example, a minimum statistics algorithm or a minimum value control recursive averaging algorithm). For example, the Bluetooth headset may be provided with storage space specially used to store the noise value, and after calculating a new noise value each time, the Bluetooth headset may update the new noise value to the storage space. In other words, a latest calculated noise value is always stored in the storage space.

In this way, after determining, based on the VAD algorithm, that the voice information is valid voice information, the Bluetooth headset may perform noise reduction processing on each of the first voice component, the second voice component, and the third voice component based on the noise value in the storage space, so that recognition results obtained when the Bluetooth headset (or the mobile phone) subsequently performs voiceprint recognition on each of the first voice component, the second voice component, and the third voice component are more accurate.

S704: The Bluetooth headset sends the first voice component, the second voice component, and the third voice component to the mobile phone through the Bluetooth connection.

After obtaining the first voice component, the second voice component, and the third voice component, the Bluetooth headset may send the first voice component, the second voice component, and the third voice component to the mobile phone, so that the mobile phone performs operations S705 to S707, to implement voiceprint recognition, user identity authentication, or the like on the voice information entered by the user.

S705: The mobile phone performs voiceprint recognition on each of the first voice component, the second voice component, and the third voice component, to obtain a first voiceprint recognition result corresponding to the first voice component, a second voiceprint recognition result corresponding to the second voice component, and a third voiceprint recognition result corresponding to the third voice component.

A principle of voiceprint recognition is to compare a registered voiceprint feature of a preset user and a voiceprint feature extracted from the voice information entered by the user, and perform determining based on an algorithm. A determining result is a voiceprint recognition result.

In an embodiment, the mobile phone may prestore a registered voiceprint feature of one or more preset users. Each preset user has three registered voiceprint features: a first registered voiceprint feature obtained by performing feature extraction on a first registered voice that is of the user and that is captured when the in-ear voice sensor works, a second registered voiceprint feature obtained by performing feature extraction on a second registered voice that is of the user and that is captured when the out-of-ear voice sensor works, and a third registered voiceprint feature obtained by performing feature extraction on a third registered voice that is of the user and that is captured when the bone conduction microphone works.

The first registered voiceprint feature, the second registered voiceprint feature, and the third registered voiceprint feature need to be obtained in two phases. A first phase is a background model training phase. In the first phase, a developer may capture voices of related texts (for example, "Hey Celia") generated when a large quantity of speakers wearing the Bluetooth headset make a sound. Further, the mobile phone may perform preprocessing (for example, filtering and noise reduction) on the voice of the related text, to extract a voiceprint feature of the voice. The voiceprint feature may be a spectrogram feature, an fbank-based feature (filter bank, filter bank-based feature), an mfcc (mel-frequency cepstral coefficient, mel-frequency cepstral coefficient) feature, a plp (Perceptual Linear Prediction, perceptual linear prediction) feature, a CQCC (Constant Q Cepstral Coefficient, constant Q cepstral coefficient) feature, or the like. Different from directly extracting the foregoing voiceprint features, the mobile phone may extract two or more of the foregoing voiceprint features, and obtain a fused voiceprint feature through splicing. After the mobile phone extracts the voiceprint feature, a background model for voiceprint recognition is established based on a machine learning algorithm such as a GMM (Gaussian mixed model), an SVM (support vector machine), or a deep neural network framework. The machine learning algorithm includes but is not limited to a DNN (deep neural network) algorithm, an RNN (recurrent neural network) algorithm, an LSTM (long short term memory) algorithm, a TDNN (Time Delay Neural Network), and a Resnet (deep residual network). It can be understood that, in the foregoing operations, a UBM (Universal Background Model) is constructed by training a large quantity of voices. The UBM may be adaptively trained, and a parameter of the UBM may be adjusted based on different manufacturer requirements or user requirements.

After obtaining the background model, the mobile phone stores the obtained background model. It can be understood that, based on different execution bodies of the method, a storage location may be the mobile phone, the wearable device, or a server. It should be noted that one or more background models may be stored, and the plurality of stored background models may be obtained based on a same algorithm or different algorithms. The plurality of stored background models may implement fusion of voiceprint models. For example, the Resnet (that is, the deep residual network) may be used for training to obtain a voiceprint model of a first background speaker, the TDNN (time delay neural network) may be used for training to obtain a voiceprint model of a second background speaker, and the RNN (that is, the recurrent neural network) may be used for training to obtain a voiceprint model of a third background speaker. It can be understood that, in an embodiment of the application, a model may be established for each of an air microphone and a bone vibration microphone, and a plurality of models may be fused. The mobile phone or the Bluetooth headset may separately establish a plurality of voiceprint models based on the background models and with reference to features of different voice sensors in a wearable device connected to the mobile phone. For example, a first voiceprint model corresponding to the in-ear voice sensor of the Bluetooth headset, a second voiceprint model corresponding to the out-of-ear voice sensor of the Bluetooth headset, and a third voiceprint model corresponding to the bone vibration sensor of the Bluetooth headset are established. The mobile phone may locally store the first voiceprint model, the second voiceprint model, and the third voiceprint model in the mobile phone, or may send the first voiceprint model, the second voiceprint model, and the third voiceprint model to the Bluetooth headset for storage.

A second phase is a process in which when the user uses a voiceprint recognition function on the mobile phone for a first time, the user enters a registered voice, and the mobile phone extracts the first registered voiceprint feature, the second registered voiceprint feature, and the third registered voiceprint feature of the user by using the in-ear voice sensor, the out-of-ear voice sensor, and the bone vibration sensor of the Bluetooth headset connected to the mobile phone. In this phase, a registration process may be performed by using a voiceprint recognition option in a device biometric recognition function built in a system of the mobile phone, or a registration process may be performed by invoking a system program by using a downloaded app. For example, when a preset user 1 uses a voice assistant app installed in the mobile phone for a first time, the voice assistant app may prompt the user to wear the Bluetooth headset and say a registration voice of "Hey Celia". Similarly, because the Bluetooth headset includes the in-ear voice sensor, the out-of-ear voice sensor, and the bone vibration sensor, the Bluetooth headset may obtain a first registered voice component that is of the registered voice and that is captured by using the in-ear voice sensor, the second registered voice component captured by using the out-of-ear voice sensor, and the third registered voice component captured by using the bone vibration sensor. Further, after the Bluetooth headset sends the first registered voice component, the second registered voice component, and the third registered voice component to the mobile phone, the mobile phone may separately perform feature extraction on the first registered voice component by using a first voiceprint model, to obtain the first registered voiceprint feature, perform feature extraction on the second registered voice component by using a second voiceprint model, to obtain the second registered voiceprint feature, and perform feature extraction on the third registered voice component by using a third voiceprint model, to obtain the third registered voiceprint feature. The mobile phone may locally store the first registered voiceprint feature, the second registered voiceprint feature, and the third registered voiceprint feature of the preset user 1, or may send the first registered voiceprint feature, the second registered voiceprint feature, and the third registered voiceprint feature of the preset user 1 to the Bluetooth headset for storage.

In an embodiment, when extracting the first registered voiceprint feature, the second registered voiceprint feature, and the third registered voiceprint feature of the preset user 1, the mobile phone may further use a currently connected Bluetooth headset as a preset Bluetooth device. For example, the mobile phone may locally store an identifier of the preset Bluetooth device (for example, a MAC address of the Bluetooth headset) in the mobile phone. In this case, the mobile phone may receive and execute a related operation instruction sent by the preset Bluetooth device, and when an unauthorized Bluetooth device sends an operation instruction to the mobile phone, the mobile phone may discard the operation instruction, to improve security. One mobile phone may manage one or more preset Bluetooth devices. As shown in (a) in FIG. 11, the user may access a settings interface 1101 of the voiceprint recognition function from a setting function, and after tapping a setting button 1105, the user may access a preset device management interface 1106 shown in (b) in FIG. 11. The user may add or delete the preset Bluetooth device in the preset device management interface 1106.

In operation S705, after obtaining the first voice component, the second voice component, and the third voice component of the voice information, the mobile phone may separately extract a voiceprint feature of the first voice component to obtain the first voiceprint feature, extract a voiceprint feature of the second voice component to obtain the second voiceprint feature, and extract a voiceprint feature of the third voice component to obtain the third voiceprint feature, to match the first registered voiceprint feature of the preset user 1 and the first voiceprint feature, match the second registered voiceprint feature of the preset user 1 and the second voiceprint feature, and match the third registered voiceprint feature of the preset user 1 and the third voiceprint feature. For example, the mobile phone may calculate, based on an algorithm, a first matching degree (that is, the first voiceprint recognition result) between the first registered voiceprint feature and the first voice component, a second matching degree (that is, the second voiceprint recognition result) between the second registered voiceprint feature and the second voice component, and a third matching degree (that is, the third voiceprint recognition result)

between the third registered voiceprint feature and the third voice component. Usually, a higher matching degree indicates a higher similarity between a voiceprint feature in the voice information and the voiceprint feature of the preset user 1, and a higher probability that the user entering the voice information is the preset user 1.

For example, when an average value of the first matching degree, the second matching degree, and the third matching degree is greater than 80 points, the mobile phone may determine that the first voiceprint feature matches the first registered voiceprint feature, the second voiceprint feature matches the second registered voiceprint feature, and the third voiceprint feature matches the third registered voiceprint feature. Alternatively, when the first matching degree, the second matching degree, and the third matching degree each are greater than 85 points, the mobile phone may determine that the first voiceprint feature matches the first registered voiceprint feature, the second voiceprint feature matches the second registered voiceprint feature, and the third voiceprint feature matches the third registered voiceprint feature.

The first registered voiceprint feature is obtained by performing feature extraction by using the first voiceprint model, and the first registered voiceprint feature indicates a voiceprint feature that is of the preset user and that is captured by the in-ear voice sensor. The second registered voiceprint feature is obtained by performing feature extraction by using the second voiceprint model, and the second registered voiceprint feature indicates a voiceprint feature that is of the preset user and that is captured by the out-of-ear voice sensor. The third registered voiceprint feature is obtained by performing feature extraction by using the third voiceprint model, and the third registered voiceprint feature indicates the voiceprint feature that is of the preset user and that is captured by the bone vibration sensor. It can be understood that a function of a voiceprint model is to extract a voiceprint feature of an entered voice. When the entered voice is a registered voice, the voiceprint model can extract a registered voiceprint feature of the registered voice. When the entered voice is a voice that is said by the user at a time, the voiceprint model can extract a voiceprint feature of the voice. In an embodiment, a voiceprint feature obtaining manner may alternatively be a fusion manner, and includes a voiceprint model fusion manner and a voiceprint feature fusion manner.

In an embodiment, the algorithm for calculating the matching degree may be calculating a similarity. The mobile phone performs feature extraction on the first voice component to obtain the first voiceprint feature, and separately calculates a first similarity between the first voiceprint feature and the prestored first registered voiceprint feature of the preset user, a second similarity between the second voiceprint feature and the prestored second registered voiceprint feature of the preset user, and a third similarity between the third voiceprint feature and the prestored third registered voiceprint feature of the preset user.

If the mobile phone stores registered voiceprint features of a plurality of preset users, the mobile phone may further calculate a first matching degree between the first voice component and another preset user (for example, a preset user 2 or a preset user 3), and a second matching degree between the second voice component and another preset user one by one in the foregoing method. Further, the Bluetooth headset may determine a preset user (for example, a preset user A) with a highest matching degree as a current speaking user.

In addition, before performing voiceprint recognition on the first voice component, the second voice component, and the third voice component, the mobile phone may further pre-determine whether voiceprint recognition needs to be performed on the first voice component, the second voice component, and the third voice component. A determining manner may be performing keyword detection on the voice information. When the voice information includes a preset keyword, the mobile phone performs voiceprint recognition on each of the first voice component, the second voice component, and the third voice component. Alternatively, a determining manner may be detecting user input. When a preset operation entered by the user is received, the mobile phone performs voiceprint recognition on each of the first voice component, the second voice component, and the third voice component. A manner of keyword detection may be that, if a similarity is greater than a preset threshold after voice recognition is performed on the keyword, it is considered that keyword detection succeeds.

In an embodiment, if the Bluetooth headset or the mobile phone may identify the preset keyword from the voice information entered by the user, for example, a keyword related to user privacy or a fund behavior such as "transfer", "payment", "**bank", or "chat record", it indicates that a security requirement imposed when the user controls the mobile phone by using a voice is high. Therefore, the mobile phone may perform operation S705, to perform voiceprint recognition. For another example, if the Bluetooth headset detects a preset operation that is entered by the user and that is used to enable the voiceprint recognition function, for example, an operation of tapping the Bluetooth headset, or an operation of simultaneously pressing a volume up button and a volume down button, it indicates that the user needs to verify a user identity through voiceprint recognition. Therefore, the Bluetooth headset may notify the mobile phone to perform operation S705, that is, perform voiceprint recognition.

Alternatively, keywords corresponding to different security levels may be preset in the mobile phone. For example, a keyword at a highest security level includes "pay", "payment", or the like, a keyword at a high security level includes "photographing", "calling", or the like, and a keyword at a lowest security level includes "listening to a song", "navigation", or the like. In this way, when it is detected that the captured voice information includes a keyword at the highest security level, the mobile phone may be triggered to perform voiceprint recognition on each of the first voice component, the second voice component, and the third voice component, that is, perform voiceprint recognition on all the three captured voices, to improve security of controlling the mobile phone by using a voice. When it is detected that the captured voice information includes a keyword at the high security level, because a security requirement imposed when the user controls the mobile phone by using a voice is medium, the mobile phone may be triggered to perform voiceprint recognition only on the first voice component, the second voice component, or the third voice component. When it is detected that the captured voice information includes a keyword of the lowest security level, the mobile phone does not need to perform voiceprint recognition on the first voice component, the second voice component, or the third voice component.

Certainly, if the voice information captured by the Bluetooth headset does not include a keyword, it indicates that currently captured voice information may be only voice information sent by the user in a normal conversation. Therefore, the mobile phone does not need to perform voiceprint recognition on the first voice component, the second voice component, or the third voice component, to reduce power consumption of the mobile phone.

Alternatively, the mobile phone may further preset one or more wake-up words to wake up the mobile phone and enable the voiceprint recognition function. For example, the wake-up word may be "Hey Celia". After the user enters voice information to the Bluetooth headset, the Bluetooth headset or the mobile phone may identify whether the voice information is a wake-up voice including the wake-up word. For example, the Bluetooth headset may send the first voice component, the second voice component, and the third voice component of the captured voice information to the mobile phone. If the mobile phone further identifies that the voice information includes the wake-up word, the mobile phone may enable the voiceprint recognition function (for example, the mobile phone may power on a voiceprint recognition chip). Subsequently, if the voice information captured by the Bluetooth headset includes the keyword, the mobile phone may perform voiceprint recognition in the method in operation S705 by using the enabled voiceprint recognition function.

For another example, after capturing the voice information, the Bluetooth headset may further identify whether the voice information includes the wake-up word. If the voice information includes the wake-up word, it indicates that the user may need to use the voiceprint recognition function subsequently. In this case, the Bluetooth headset may send an enabling instruction to the mobile phone, so that the mobile phone enables the voiceprint recognition function in response to the enabling instruction.

S706: The mobile phone performs user identity authentication based on the first voiceprint recognition result, the second voiceprint recognition result, and the third voiceprint recognition result.

In operation S706, after obtaining, through voiceprint recognition, the first voiceprint recognition result corresponding to the first voice component, the second voiceprint recognition result corresponding to the second voice component, and the third voiceprint recognition result corresponding to the third voice component, the mobile phone may perform, by combining the three voiceprint recognition results, identity authentication on the user entering the voice information, to improve accuracy and security of user identity authentication.

For example, a first matching degree between the first registered voiceprint feature of the preset user and the first voiceprint feature is the first voiceprint recognition result, a second matching degree between the second registered voiceprint feature of the preset user and the second voiceprint feature is the second voiceprint recognition result, and a third matching degree between the third registered voiceprint feature of the preset user and the third voiceprint feature is the third voiceprint recognition result. During user identity authentication, if the first matching degree, the second matching degree, and the third matching degree satisfy a preset authentication policy, for example, the authentication policy is that when the first matching degree is greater than a first threshold, the second matching degree is greater than a second threshold, and the third matching degree is greater than a third threshold (the third threshold, the second threshold, and the first threshold may be the same or different), the mobile phone determines that a user who sends the first voice component, the second voice component, and the third voice component is a preset user; or if the first matching degree, the second matching degree, or the third matching degree does not satisfy a preset authentication policy, the mobile phone may determine that a user who sends the first voice component, the second voice component, and the third voice component is an unauthorized user.

For another example, the mobile phone may calculate a weighted average value of the first matching degree and the second matching degree. When the weighted average value is greater than a preset threshold, the mobile phone may determine that the user sending the first voice component, the second voice component, and the third voice component is a preset user; or when the weighted average value is not greater than a preset threshold, the mobile phone may determine that the user sending the first voice component, the second voice component, and the third voice component is an unauthorized user.

Alternatively, the mobile phone may use different authentication policies in different voiceprint recognition scenarios. For example, when the captured voice information includes a keyword at the highest security level, the mobile phone may set each of the first threshold, the second threshold, and the third threshold to 99 points. In this case, only when the first matching degree, the second matching degree, and the third matching degree are all greater than 99 points, the mobile phone determines that a current speaking user is a preset user. When the captured voice information includes a keyword at a low security level, the mobile phone may set each of the first threshold, the second threshold, and the third threshold to 85 points. In this case, when the first matching degree, the second matching degree, and the third matching degree are all greater than points, the mobile phone may determine that a current speaking user is a preset user. In other words, for voiceprint recognition scenarios at different security levels, the mobile phone may perform user identity authentication based on authentication policies at different security levels.

In addition, if the mobile phone stores voiceprint models of one or more preset users, for example, the mobile phone stores registered voiceprint features of a preset user A, a preset user B, and a preset user C, registered voiceprint features of each preset user include a first registered voiceprint feature, a second registered voiceprint feature, and a third registered voiceprint feature. In this case, the mobile phone may respectively match, in the foregoing method, the captured first voice component, second voice component, and third voice component with the registered voiceprint features of each preset user. Further, the mobile phone may determine that a preset user (for example, the preset user A) who satisfies the authentication policy and who has a highest matching degree is a current speaking user.

In this way, after receiving the first voice component, the second voice component, and the third voice component of the voice information sent by the Bluetooth headset, the mobile phone may perform voiceprint recognition after fusing the first voice component, the second voice component, and the third voice component. For example, the mobile phone calculates a matching degree between the fused first voice component, second voice component, and third voice component and a voiceprint model of a preset user. Further, the mobile phone can also perform user identity authentication based on the matching degree. Because the voiceprint models of the preset users are fused into one in such an identity authentication method, complexity of the voiceprint model and required storage space are reduced correspondingly. In addition, because voiceprint feature information of the second voice component is used, there is a dual voiceprint assurance and a liveness detection function.

For another example, the algorithm for calculating the matching degree may be calculating a similarity. The mobile phone performs feature extraction on the first voice component to obtain the first voiceprint feature, separately calculates the first similarity between the first voiceprint feature and the prestored first registered voiceprint feature of the preset user, the second similarity between the second voiceprint feature and the prestored second registered voiceprint feature of the preset user, and the third similarity between the third voiceprint feature and the prestored third registered voiceprint feature of the preset user, and performs identity authentication on the user based on the first similarity, the second similarity, and the third similarity. A method for calculating a similarity includes a Euclidean distance (Euclidean Distance), a cosine similarity (Cosine), a Pearson correlation coefficient (Pearson), an adjusted cosine similarity (Adjusted Cosine), a Hamming distance (Hamming Distance), a Manhattan distance (Manhattan Distance), and the like. This is not limited in this application.

A manner of performing identity authentication on the user may be as follows: The mobile phone separately determines a first fusion coefficient corresponding to the first similarity, a second fusion coefficient corresponding to the second similarity, and a third fusion coefficient corresponding to the third similarity based on a decibel of an ambient sound and a playing volume of the Bluetooth headset; and fuses the first similarity, the second similarity, and the third similarity based on the first fusion coefficient, the second fusion coefficient, and the third fusion coefficient, to obtain a fused similarity score. If the fused similarity score is greater than a first threshold, the mobile phone determines that the user who enters the voice information to the Bluetooth headset is a preset user.

In an embodiment, the decibel of the ambient sound is detected by a sound pressure sensor of the Bluetooth headset and sent to the mobile phone, and the playing volume may be obtained by detecting a playing signal by a loudspeaker of the Bluetooth headset and sent to the mobile phone, or may be obtained by the mobile phone by invoking data of the mobile phone.

In an embodiment, the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value. To be specific, when the sum of the first fusion coefficient, the second fusion coefficient, and the third fusion coefficient is a preset fixed value, a larger decibel of the ambient sound indicates a smaller second fusion coefficient. In this case, correspondingly, the first fusion coefficient and the third fusion coefficient are adaptively increased, to maintain the sum of the first fusion coefficient, the second fusion coefficient, and the third fusion coefficient unchanged. A higher playing volume indicates a smaller first fusion coefficient and a smaller third fusion coefficient. In this case, correspondingly, the second fusion coefficient is adaptively increased, to maintain the sum of the first fusion coefficient, the second fusion coefficient, and the third fusion coefficient unchanged. It can be understood that in an embodiment, the fusion coefficient is dynamic. In other words, the fusion coefficient dynamically changes based on the ambient sound and the playing volume, and the fusion coefficient is dynamically determined based on a decibel of a surrounding ambient sound detected by the microphone and a playing volume detected by the in-ear voice sensor. If the decibel of the ambient sound is high, it indicates that an ambient noise level is high, and it may be considered that the Bluetooth headset is greatly affected by the ambient noise. Therefore, in the voice control method provided in this application, fusion coefficients corresponding to an out-of-ear voice sensor and the bone vibration sensor of the Bluetooth headset need to be reduced, and a result of the fused similarity score more depends on the in-ear voice sensor that is less affected by the ambient noise. On the contrary, if the playing volume is high, it indicates that a noise level of a playing sound in the ear canal is high, it may be considered that the in-ear voice sensor of the Bluetooth headset is greatly affected by the playing sound. Therefore, in the voice control method provided in this application, a fusion coefficient corresponding to the in-ear voice sensor needs to be reduced, and a result of the fused similarity score more depends on the out-of-ear voice sensor and the bone vibration sensor that are less affected by the playing sound.

In an embodiment, when a system is designed, a lookup table may be set based on the foregoing principle. In use, the fusion coefficient may be determined based on a monitored volume of the Bluetooth headset and the decibel of the ambient sound by searching a table. For example, Table 1-1 shows an example. Fusion coefficients of similarity scores of voice signals captured by the in-ear voice sensor and the bone vibration sensor are respectively represented by a1 and a2, and a fusion coefficient of similarity scores of voice signals captured by the out-of-ear voice sensor is represented by b1. When the ambient sound exceeds 60 dB, it may be considered that an external environment is noisy, a voice signal captured by the out-of-ear voice sensor includes much ambient noise, and a fusion coefficient corresponding to the voice signal captured by the out-of-ear voice sensor may have a low value or may be directly set to 0. When a playing volume of the loudspeaker inside the headset exceeds 80% of a total volume, it may be considered that the volume inside the headset is too high, and a fusion coefficient corresponding to a voice signal captured by the in-ear voice sensor may have a low value or may be directly set to 0. When the external ambient noise is too high (for example, the ambient sound exceeds 60 dB) and the volume of the loudspeaker is too high (for example, the volume of the loudspeaker of the headset exceeds 60% of the total volume), interference of the captured voice signal is too high, and voiceprint recognition fails. It can be understood that, in an application, "volume 20%", "volume 40%", "ambient sound 20 dB", and "ambient sound 40 dB" may represent a range. For example, "volume 20%" indicates "volume 10% to 30%", "volume 40%" indicates "volume 30% to 50%", "ambient sound 20 dB" indicates "ambient sound 10 dB to 30 dB", and "ambient sound 40 dB" indicates "ambient sound 30 dB to 50 dB".

TABLE 1-1

| Volume<br>Ambient sound | 0% | 20% | 40% | 60% | 80% | 100% |
|---|---|---|---|---|---|---|
| 0 dB | a1 = 0.4<br>a2 = 0.2<br>b1 = 0.4 | a1 = 0.3<br>a2 = 0.2<br>b1 = 0.5 | a1 = 0.28<br>a2 = 0.17<br>b1 = 0.55 | a1 = 0.2<br>a2 = 0.15<br>b1 = 0.65 | a1 = 0<br>a2 = 0.15<br>b1 = 0.85 | a1 = 0<br>a2 = 0.1<br>b1 = 0.9 |
| 20 dB | a1 = 0.3<br>a2 = 0.4<br>b1 = 0.3 | a1 = 0.27<br>a2 = 0.4<br>b1 = 0.33 | a1 = 0.2<br>a2 = 0.4<br>b1 = 0.4 | a1 = 0.15<br>a2 = 0.45<br>b1 = 0.4 | a1 = 0<br>a2 = 0.45<br>b1 = 0.55 | a1 = 0<br>a2 = 0.45<br>b1 = 0.55 |

TABLE 1-1-continued

| Volume Ambient sound | 0% | 20% | 40% | 60% | 80% | 100% |
|---|---|---|---|---|---|---|
| 40 dB | a1 = 0.3<br>a2 = 0.5<br>b1 = 0.2 | a1 = 0.25<br>a2 = 0.5<br>b1 = 0.25 | a1 = 0.18<br>a2 = 0.52<br>b1 = 0.3 | a1 = 0.1<br>a2 = 0.55<br>b1 = 0.35 | a1 = 0<br>a2 = 0.6<br>b1 = 0.4 | a1 = 0<br>a2 = 0.6<br>b1 = 0.4 |
| 60 dB | a1 = 0.3<br>a2 = 0.6<br>b1 = 0.1 | a1 = 0.25<br>a2 = 0.65<br>b1 = 0.1 | a1 = 0.2<br>a2 = 0.7<br>b1 = 0.1 | — | — | |
| 80 dB | a1 = 0.3<br>A2 = 0.7<br>b1 = 0 | a1 = 0.2<br>a2 = 0.8<br>b1 = 0 | a1 = 0.15<br>a2 = 0.85<br>b1 = 0 | — | — | |

It can be understood that the foregoing embodiment is merely an example. A parameter setting, a threshold setting, and coefficients corresponding to different decibels of ambient sounds and volumes of the loudspeaker may be designed and modified based on an actual situation. This is not limited in this application. It should be noted that the fusion coefficient provided in an embodiment of the application can be understood as a "dynamic fusion coefficient". In other words, the fusion coefficient may be dynamically adjusted based on different decibels of ambient sounds and volumes of the loudspeaker.

For example, in an embodiment, in S706, a policy of performing identity authentication on the user based on fusion of the first voiceprint recognition result, the second voiceprint recognition result, and the third voiceprint recognition result may be changed to a method of directly fusing audio features, extracting a voiceprint feature based on a fused audio feature and the voiceprint model, calculating a similarity between the voiceprint feature and the prestored registered voiceprint feature of the user, and performing identity authentication. In an embodiment, audio features feaE1 and feaE2 of each frame are extracted from voice signals of a current user that are captured by the in-ear voice sensor and the out-of-ear voice sensor. An audio feature feaB1 of each frame is extracted from a voice signal that is of the current user and that is captured by a bone voiceprint sensor. Fusion of the audio features feaE1, feaE2, and feaB1 includes but is not limited to the following method: performing normalization processing on feaE1, feaE2, and feaB1, to obtain feaE1', feaE2', and feaB1', and then splicing feaE1', feaE2', and feaB1' into a feature vector fea=[feaE1', feaE2', feaB1']. Voiceprint feature extraction is performed on the feature vector fea by using the voiceprint model, to obtain a voiceprint feature of the current user. Likewise, a voiceprint feature of a registered user may be obtained from a registered voice of the registered user reference to the foregoing method. A similarity comparison is performed between the voiceprint feature of the current user and the voiceprint feature of the registered user, to obtain a similarity score, and a relationship between the similarity score and a preset threshold is determined, to obtain an authentication result.

For example, in an embodiment, a policy of performing identity authentication on the user based on fusion of the first similarity, the second similarity, and the third similarity in S706 may be changed to a method of fusing the first voiceprint feature, the second voiceprint feature, and the third voiceprint feature, to obtain a fused voiceprint feature, calculating a similarity between the fused voiceprint feature and a prestored registered fused voiceprint feature of the preset user, and performing identity authentication. In an embodiment, feature extraction is performed, by using a voiceprint model, on voice signals of a current user that are captured by the in-ear voice sensor and the out-of-ear voice sensor, to obtain voiceprint features e1 and e2. Feature extraction is performed, by using a voiceprint model, on a voice signal that is of the current user and that is captured by a bone voiceprint sensor, to obtain a voiceprint feature b1. The voiceprint features e1, e2, and b1 are spliced and fused, to obtain a spliced voiceprint feature m1=[e1, e2, b1] of the current user. Likewise, a spliced voiceprint feature of a registered user may be obtained from a registered voice of the registered user reference to the foregoing method. A similarity comparison is performed between the spliced voiceprint feature of the current user and the spliced voiceprint feature of the registered user, to obtain a similarity score, and a relationship between the similarity score and a preset threshold is determined, to obtain an authentication result.

S707: If the user is a preset user, the mobile phone executes an operation instruction corresponding to the voice information.

In the authentication process in operation S706, if authentication succeeds, the mobile phone determines that the speaking user who enters the voice information in operation S702 is a preset user, and the mobile phone may execute the operation instruction corresponding to the voice information; or if authentication fails, the mobile phone does not execute a subsequent operation instruction. It can be understood that the operation instruction includes but is not limited to a mobile phone unlocking operation or a payment confirmation operation. For example, when the voice information is "Hey Celia, pay by using WeChat", the operation instruction corresponding to the voice information is displaying a payment interface of a WeChat app. In this way, after generating an operation instruction for displaying the payment interface of the WeChat app, the mobile phone may automatically open the WeChat app, and display the payment interface of the WeChat app.

Figure 9:
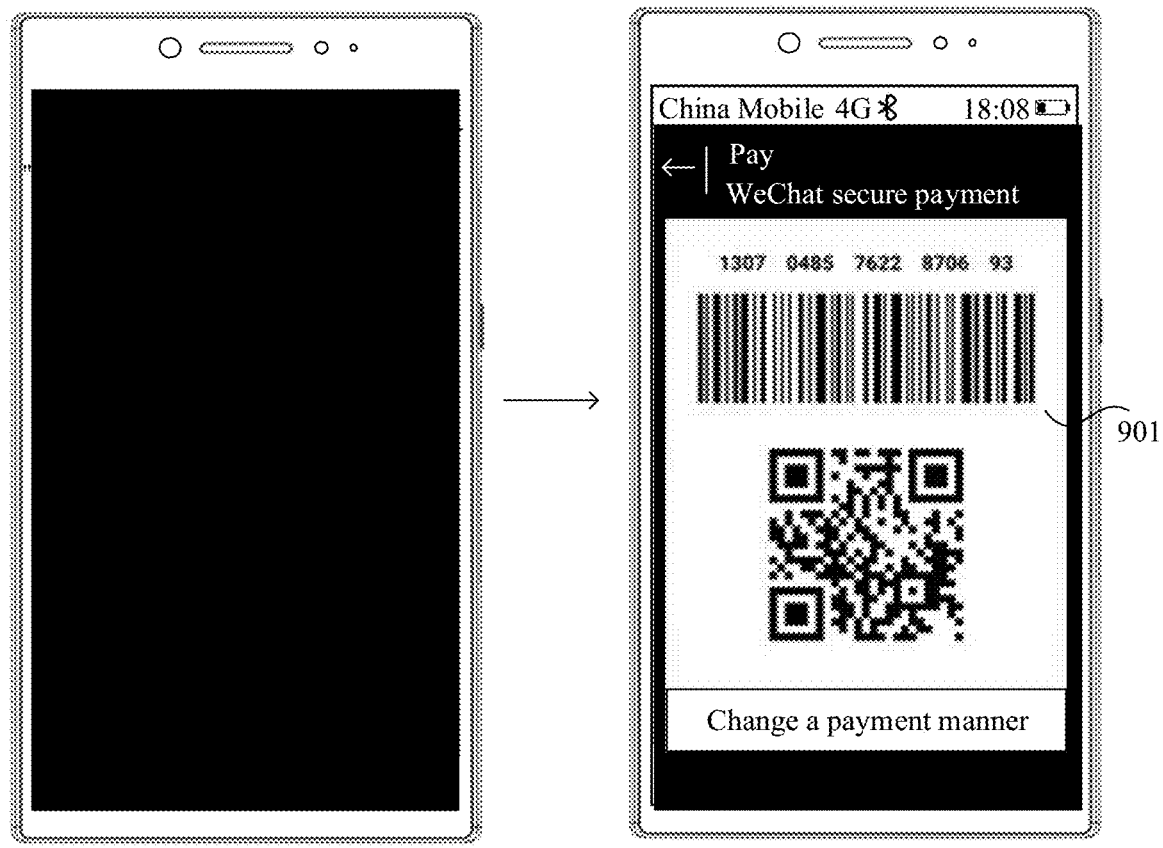
FIG. 9 is a schematic diagram of a payment interface according to an embodiment of this application.

In addition, because the mobile phone has determined that the user is a preset user, as shown in FIG. 9, if the mobile phone is currently in a locked state, the mobile phone may unlock a screen, and then execute the operation instruction for displaying the payment interface of the WeChat app, to display a payment interface 901 of the WeChat app.

For example, the voice control method provided in operations S701 to S707 may be a function provided by the voice assistant app. When the Bluetooth headset interacts with the mobile phone, if determining, through voiceprint recognition, that a current speaking user is a preset user, the mobile phone may send data such as the generated operation instruction or the voice information to the voice assistant app running at an application layer. Further, the voice assistant app invokes a related interface or service at an application framework layer to execute the operation instruction corresponding to the voice information.

It can be learned that, in the voice control method provided in an embodiment of the application, the mobile phone may be unlocked and execute the operation instruction corresponding to the voice information while identifying the user identity based on a voiceprint. In other words, the user only needs to enter the voice information for one time to complete a series of operations such as user identity authentication, mobile phone unlocking, and enabling a function of the mobile phone, to greatly improve control efficiency of the user for the mobile phone and user experience.

Figure 10:
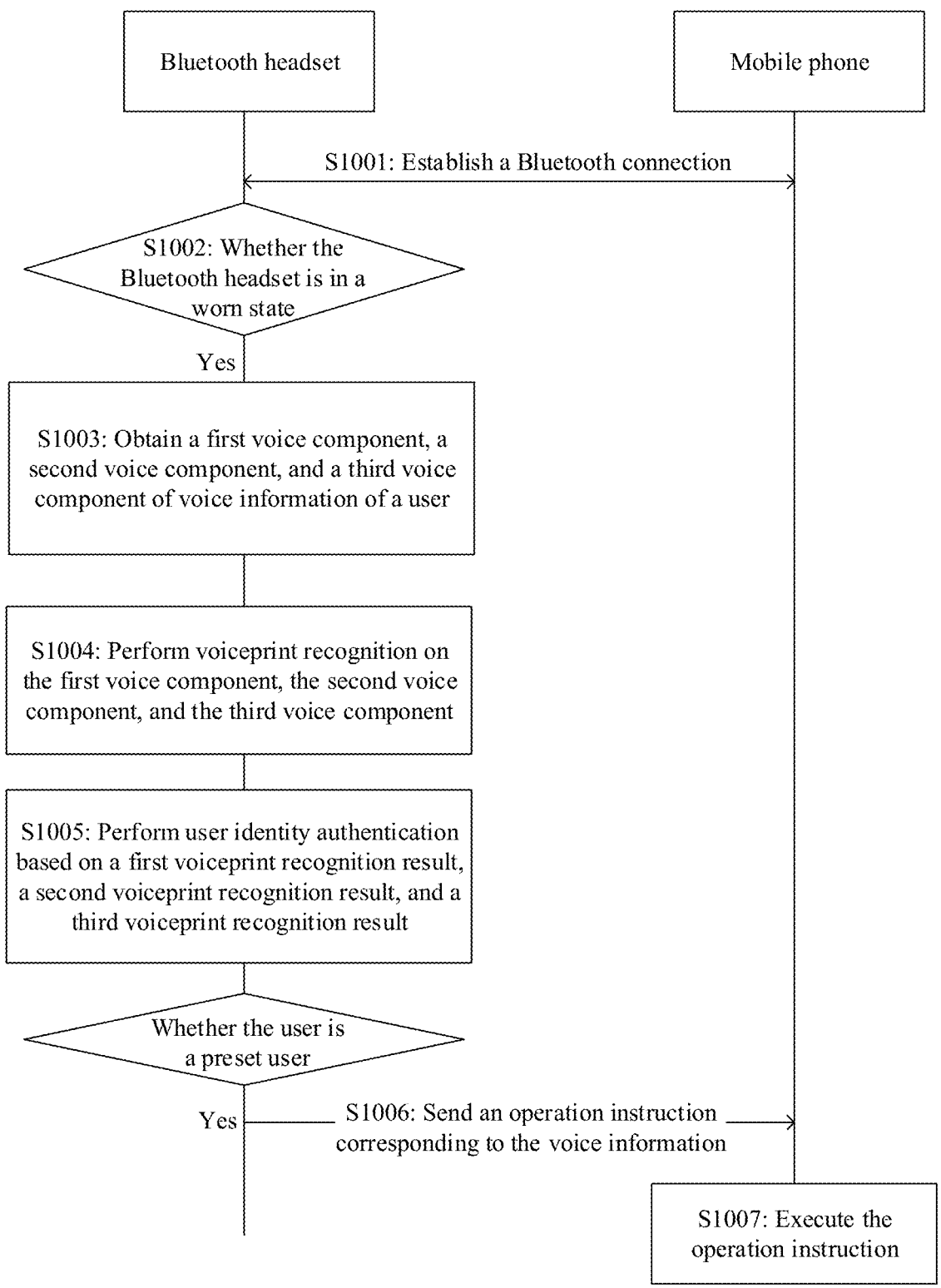
FIG. 10 is a schematic diagram of another voice control method according to an embodiment of this application.

In operations S701 to S707, the mobile phone is used as an execution body to perform operations such as voiceprint recognition and user identity authentication. It can be understood that operations S701 to S707 may alternatively be all or partially completed by the Bluetooth headset, to reduce implementation complexity of the mobile phone and power consumption of the mobile phone. As shown in FIG. 10, a voice control method may include the following operations.

S1001: A mobile phone establishes a Bluetooth connection to a Bluetooth headset.

S1002 (optional): The Bluetooth headset detects whether the Bluetooth headset is in a worn state.

S1003: If the Bluetooth headset is in the worn state, the Bluetooth headset performs capturing by using a first voice sensor, to obtain a first voice component of voice information entered by a user, captures a second voice component of the voice information by using a second voice sensor, and captures a third voice component of the voice information by using a bone vibration sensor.

For a method for establishing the Bluetooth connection between the Bluetooth headset and the mobile phone, detecting whether the Bluetooth headset is in the worn state, and detecting the first voice component, the second voice component, and the third voice component of the voice information in operations S1001 to S1003, refer to related descriptions of operations S701 to S703. Details are not described herein again.

It should be noted that, after obtaining the first voice component, the second voice component, and the third voice component, the Bluetooth headset may further perform enhancement, noise reduction, filtering, or the like on the detected first voice component and the detected second voice component. This is not limited in an embodiment of the application.

In some embodiments of this application, because the Bluetooth headset has an audio playback function, when a loudspeaker of the Bluetooth headset is working, an air conduction microphone and a bone conduction microphone on the Bluetooth headset may receive an echo signal of a voice played by the loudspeaker. Therefore, after obtaining the first voice component and the second voice component, the Bluetooth headset may further cancel an echo signal in each of the first voice component and the second voice component based on an echo cancellation algorithm (adaptive echo cancellation, AEC), to improve accuracy of subsequent voiceprint recognition.

S1004: The Bluetooth headset performs voiceprint recognition on each of the first voice component, the second voice component, and the third voice component, to obtain a first voiceprint recognition result corresponding to the first voice component, a second voiceprint recognition result corresponding to the second voice component, and a third voiceprint recognition result corresponding to the third voice component.

Different from operations S701 to S707, in operation S1004, the Bluetooth headset may prestore one or more voiceprint models and a registered voiceprint feature of a preset user. In this way, after obtaining the first voice component, the second voice component, and the third voice component, the Bluetooth headset may perform voiceprint recognition on the first voice component, the second voice component, and the third voice component by using a voiceprint model locally stored in the Bluetooth headset, to separately obtain voiceprint features corresponding to the voice components, and compare the voiceprint features corresponding to the obtained voice components with corresponding registered voiceprint features. In this way, voiceprint recognition is performed. For a method in which the Bluetooth headset performs voiceprint recognition on each of the first voice component, the second voice component, and the third voice component, refer to a method in which the mobile phone performs voiceprint recognition on each of the first voice component, the second voice component, and the third voice component in operation S705. Therefore, details are not described herein again.

S1005: The Bluetooth headset performs user identity authentication based on the first voiceprint recognition result, the second voiceprint recognition result, and the third voiceprint recognition result.

For a process in which the Bluetooth headset performs user identity authentication based on the first voiceprint recognition result, the second voiceprint recognition result, and the third voiceprint recognition result, refer to related descriptions in which the mobile phone performs user identity authentication based on the first voiceprint recognition result, the second voiceprint recognition result, and the third voiceprint recognition result in operation S706. Details are not described herein again.

S1006: If the user is a preset user, the Bluetooth headset sends an operation instruction corresponding to the voice information to the mobile phone through the Bluetooth connection.

S1007: The mobile phone executes the operation instruction.

If the Bluetooth headset determines that a speaking user entering the voice information is a preset user, the Bluetooth headset may generate the operation instruction corresponding to the voice information. For the operation instruction, refer to an example of the operation instruction of the mobile phone in operation S707. Details are not described herein again.

In addition, because the Bluetooth headset has determined that the user is a preset user, when the mobile phone is in a locked state, the Bluetooth headset may further send a message indicating that user identity authentication succeeds or an unlocking instruction to the mobile phone, so that the mobile phone may unlock a screen, and then execute the operation instruction corresponding to the voice information. Certainly, the Bluetooth headset may alternatively send the captured voice information to the mobile phone, and the mobile phone generates a corresponding operation instruction based on the voice information, and executes the operation instruction.

In some embodiments of this application, when sending the voice information or the corresponding operation instruction to the mobile phone, the Bluetooth headset may further send a device identifier (for example, a MAC address) of the Bluetooth headset to the mobile phone. Because the mobile phone has stored an identifier of a preset Bluetooth device whose authentication succeeds, the mobile phone may determine, based on the received device identifier, whether a currently connected Bluetooth headset is a preset Bluetooth device. If the Bluetooth headset is a preset Bluetooth device, the mobile phone may further execute the operation instruction sent by the Bluetooth headset, or perform voice recognition, or the like on the voice information sent by the Bluetooth headset; or if the Bluetooth headset is not a preset Bluetooth device, the mobile phone may discard the operation instruction sent by the Bluetooth headset, to avoid a security problem caused when an unauthorized Bluetooth device maliciously controls the mobile phone.

Alternatively, the mobile phone and the preset Bluetooth device may pre-agree on a passcode or a password for transmitting the operation instruction. In this way, when sending the voice information or the corresponding operation instruction to the mobile phone, the Bluetooth headset may further send the pre-agreed passcode or password to the mobile phone, so that the mobile phone determines whether a currently connected Bluetooth headset is a preset Bluetooth device.

Alternatively, the mobile phone and the preset Bluetooth device may pre-agree on an encryption algorithm and a decryption algorithm for transmitting the operation instruction. In this way, before sending the voice information or the corresponding operation instruction to the mobile phone, the Bluetooth headset may encrypt the operation instruction based on the agreed encryption algorithm. After receiving an encrypted operation instruction, if the mobile phone can obtain the operation instruction through decryption based on the agreed decryption algorithm, it indicates that a currently connected Bluetooth headset is a preset Bluetooth device, and the mobile phone may further execute the operation instruction sent by the Bluetooth headset; or if the mobile phone cannot obtain the operation instruction through decryption based on the agreed decryption algorithm, it indicates that a currently connected Bluetooth headset is an unauthorized Bluetooth device, and the mobile phone may discard the operation instruction sent by the Bluetooth headset.

It should be noted that operations S701 to S707 and operations S1001 to S1007 are merely two implementations of the voice control method provided in this application. It can be understood that one of ordinary skilled in the art may set, based on an actual application scenario or actual experience, operations performed by the Bluetooth headset and operations performed by the mobile phone in the foregoing embodiments. This is not limited in embodiments of this application. In addition, the voice control method provided in this application may alternatively be performed by a server, that is, the Bluetooth headset establishes a connection to the server, and the server implements a function of the mobile phone in the foregoing embodiment. A process is not described herein again.

For example, after performing voiceprint recognition on the first voice component, the second voice component, and the third voice component, the Bluetooth headset may alternatively send the obtained first voiceprint recognition result, second voiceprint recognition result, and third voiceprint recognition result to the mobile phone, and subsequently, the mobile phone performs user identity authentication, or the like based on the voiceprint recognition results.

For another example, after obtaining the first voice component, the second voice component, and the third voice component, the Bluetooth headset may alternatively first determine whether voiceprint recognition needs to be performed on the first voice component, the second voice component, and the third voice component. If voiceprint recognition needs to be performed on the first voice component, the second voice component, and the third voice component, the Bluetooth headset may send the first voice component, the second voice component, and the third voice component to the mobile phone, so that the mobile phone completes subsequent voiceprint recognition, user identity authentication, or the like; or if voiceprint recognition does not need to be performed on the first voice component, the second voice component, and the third voice component, the Bluetooth headset does not need to send the first voice component, the second voice component, and the third voice component to the mobile phone, to avoid increasing power consumption existing when the mobile phone processes the first voice component, the second voice component, and the third voice component.

Figure 11:
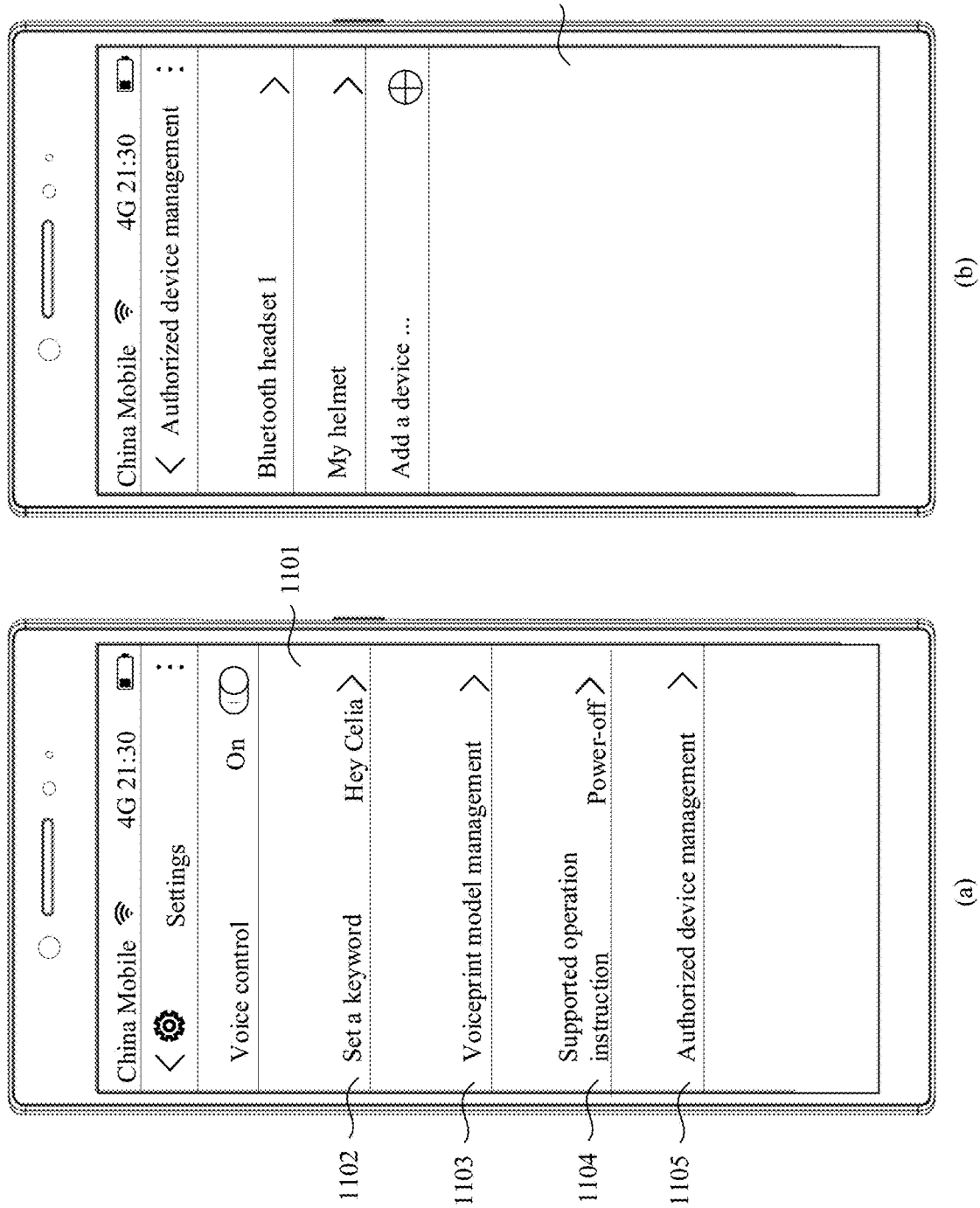
FIG. 11 is a schematic diagram of a settings interface of a mobile phone according to an embodiment of this application.

In addition, as shown in (a) in FIG. 11, the user may further access a settings interface 1101 of the mobile phone, to enable or disable a voice control function. If the user enables the voice control function, the user may set, by using a setting button 1102, a keyword for triggering the voice control function, for example, "Hey Celia" or "Pay", or the user may manage a voiceprint model of the preset user by using a setting button 1103, for example, add or delete a voiceprint model of the preset user, or the user may set, by using a setting button 1104, an operation instruction that can be supported by a voice assistant, for example, payment, making a call, or ordering a meal. In this way, the user can obtain customized voice control experience.

Figure 12:
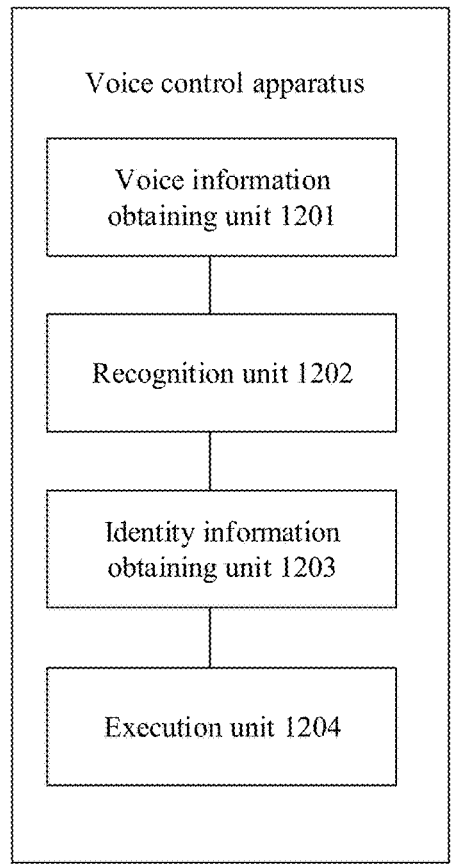
FIG. 12 is a schematic diagram of a voice control apparatus according to an embodiment of this application.

In some embodiments of this application, an embodiment of this application discloses a voice control apparatus. As shown in FIG. 12, the voice control apparatus includes a voice information obtaining unit 1201, a recognition unit 1202, an identity information obtaining unit 1203, and an execution unit 1204. It can be understood that, the voice control apparatus may be a terminal or a wearable device. The voice control apparatus may be completely integrated into the wearable device, or the wearable device and the terminal may form a voice control system. In other words, some units are located in the wearable device, and some units are located in the terminal.

In an embodiment, for example, the voice control apparatus may be completely integrated into a Bluetooth headset. The voice information obtaining unit 1201 is configured to obtain voice information of a user. In an embodiment of the application, the user may enter the voice information to the Bluetooth headset when wearing the Bluetooth headset. In this case, the Bluetooth headset may capture, based on the voice information entered by the user, a first voice component by using an in-ear voice sensor, a second voice component by using an out-of-ear voice sensor, and a third voice component by using a bone vibration sensor.

The recognition unit 1202 is configured to perform voiceprint recognition on each of the first voice component, the second voice component and the third voice component, to obtain a first voiceprint recognition result corresponding to the first voice component, a second voiceprint recognition result corresponding to the second voice component, and a third voiceprint recognition result corresponding to the third voice component.

In an embodiment, the recognition unit 1202 may be further configured to: perform keyword detection on the voice information entered by the user to the Bluetooth headset, and when the voice information includes a preset keyword, perform voiceprint recognition on each of the first voice component, the second voice component, and the third voice component; or the recognition unit 1202 may be configured to: detect user input, and when a preset operation entered by the user is received, perform voiceprint recognition on each of the first voice component, the second voice component, and the third voice component. The user input may be input of the user to the Bluetooth headset by using a touchscreen or a button. For example, the user taps an unlock button of the Bluetooth headset. In an embodiment, before the recognition unit 1202 performs keyword detection on the voice information or detects the user input, the obtaining unit 1201 may further obtain a worn state detection result. When the worn state detection result is that the wearable device is in a worn state, the recognition unit 1202 performs keyword detection on the voice information or detects the user input.

In an embodiment, the recognition unit 1202 is configured to: perform feature extraction on the first voice component, to obtain a first voiceprint feature, and calculate a first similarity between the first voiceprint feature and a first registered voiceprint feature of the preset user, where the first registered voiceprint feature is obtained by performing feature extraction on a first registered voice by using a first voiceprint model, and the first registered voiceprint feature indicates an audio feature that is of the preset user and that is captured by the in-ear voice sensor; perform feature extraction on the second voice component, to obtain a second voiceprint feature, and calculate a second similarity between the second voiceprint feature and a second registered voiceprint feature of the preset user, where the second registered voiceprint feature is obtained by performing feature extraction on a second registered voice by using a second voiceprint model, and the second registered voiceprint feature indicates an audio feature that is of the preset user and that is captured by the out-of-ear voice sensor; and perform feature extraction on the third voice component, to obtain a third voiceprint feature, and calculate a third similarity between the third voiceprint feature and a third registered voiceprint feature of the preset user, where the third registered voiceprint feature is obtained by performing feature extraction on a third registered voice by using a third voiceprint model, and the third registered voiceprint feature indicates an audio feature that is of the preset user and that is captured by the bone vibration sensor.

In an embodiment, the first registered voiceprint feature is obtained by performing feature extraction by using the first voiceprint model, and the first registered voiceprint feature indicates the voiceprint feature that is of the preset user and that is captured by the in-ear voice sensor. The second registered voiceprint feature is obtained by performing feature extraction by using the second voiceprint model, and the second registered voiceprint feature indicates the voiceprint feature that is of the preset user and that is captured by the out-of-ear voice sensor. The third registered voiceprint feature is obtained by performing feature extraction by using the third voiceprint model, and the third registered voiceprint feature indicates the voiceprint feature that is of the preset user and that is captured by the bone vibration sensor.

The identity information obtaining unit 1203 is configured to obtain user identity information, to perform user identity authentication. In an embodiment, identity information obtaining unit 1203 is configured to: separately determine a first fusion coefficient corresponding to the first similarity, a second fusion coefficient corresponding to the second similarity, and a third fusion coefficient corresponding to the third similarity based on a decibel of an ambient sound and a playing volume; and fuse the first similarity, the second similarity, and the third similarity based on the first fusion coefficient, the second fusion coefficient, and the third fusion coefficient, to obtain a fused similarity score. If the fused similarity score is greater than a first threshold, the mobile phone determines that the user who enters the voice information to the Bluetooth headset is a preset user. The decibel of the ambient sound is detected by a sound pressure sensor of the Bluetooth headset, and the playing volume may be obtained by detecting a playing signal by a loudspeaker of the Bluetooth headset.

In an embodiment, the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value. To be specific, when the sum of the first fusion coefficient, the second fusion coefficient, and the third fusion coefficient is a preset fixed value, a larger decibel of the ambient sound indicates a smaller second fusion coefficient. In this case, correspondingly, the first fusion coefficient and the third fusion coefficient are adaptively increased, to maintain the sum of the first fusion coefficient, the second fusion coefficient, and the third fusion coefficient unchanged. A higher playing volume indicates a smaller first fusion coefficient and a smaller third fusion coefficient. In this case, correspondingly, the second fusion coefficient is adaptively increased, to maintain the sum of the first fusion coefficient, the second fusion coefficient, and the third fusion coefficient unchanged. It can be understood that, recognition accuracy in different application scenarios (a case in which ambient noise is large or music is played by using a headset) can be considered based on the variable fusion coefficient.

After the mobile phone determines that the user who enters the voice information to the Bluetooth headset is a preset user, or after authentication succeeds, the execution unit 1204 is configured to execute an operation instruction corresponding to the voice information. The operation instruction includes an unlocking instruction, a payment instruction, a power-off instruction, an application starting instruction, or a call instruction.

Compared with the conventional technology, in the voice control method provided in an embodiment of the application, a method for capturing a voiceprint feature by using the in-ear voice sensor is added. After the user wears a headset including the in-ear voice sensor, an external auditory canal and a middle auditory canal form a closed cavity, and there is amplification effect, that is, cavity effect, for a sound in the cavity. Therefore, a sound captured by the in-ear voice sensor is clearer, and especially, there is obvious enhancement effect for a high-frequency sound signal; distortion caused when a high-frequency signal component of some voice information is lost when the bone vibration sensor captures voice information can be compensated for; and overall voiceprint capturing effect and voiceprint recognition accuracy of the headset can be improved, to improve user experience. In addition, in an embodiment of the application, the dynamic fusion coefficient is used when similarities are fused. For different application environments and application scenarios, voiceprint recognition results obtained for voice signals with different attributes are fused by using the dynamic fusion coefficient, and the voice signals with different attributes compensate for each other, to improve voiceprint recognition robustness and accuracy. For example, when ambient noise is large or music is played by using a headset, recognition accuracy can be significantly improved. The voice signals with different attributes may also be understood as voice signals obtained by using different sensors (the in-ear voice sensor, the out-of-ear voice sensor, and the bone vibration sensor).

Figure 13:
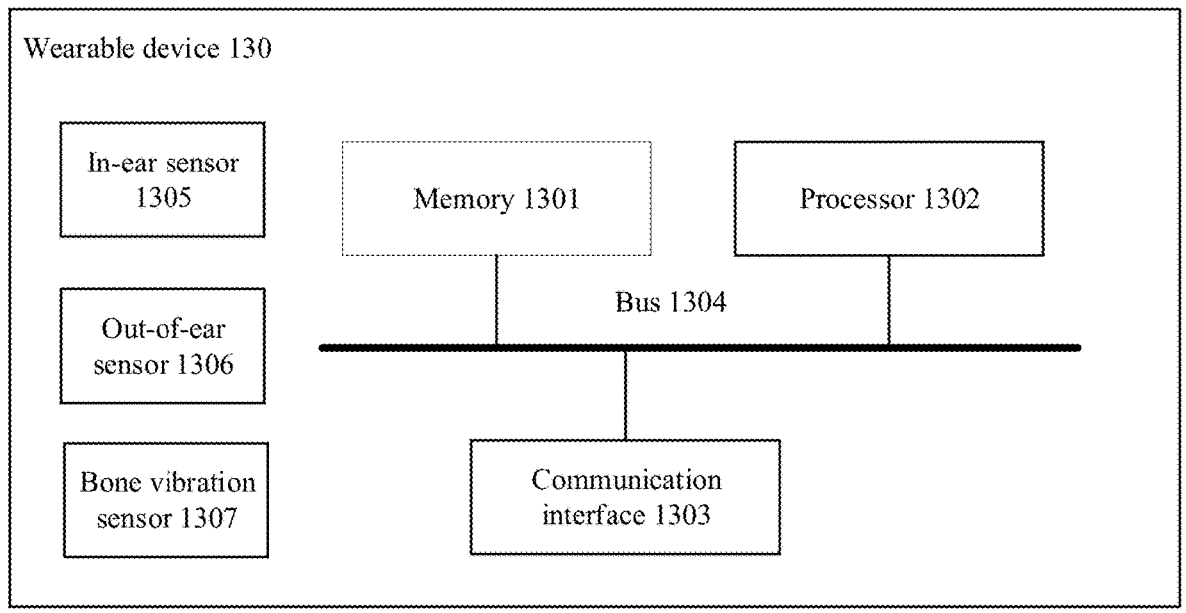
FIG. 13 is a schematic diagram of a wearable device according to an embodiment of this application.

Another embodiment of this application further provides a wearable device. FIG. 13 is a schematic diagram of a wearable device 130 according to an embodiment of this application. The wearable device shown in FIG. 13 includes a memory 1301, a processor 1302, a communication interface 1303, a bus 1304, an in-ear voice sensor 1305, an out-of-ear voice sensor 1306, and a bone vibration sensor 1307. The memory 1301, the processor 1302, and the communication interface 1303 are communicatively connected to each other through the bus 1304. The memory 1301 is coupled to the processor 1302. The memory 1301 is configured to store computer program code. The computer program code includes computer instructions. When the processor 1302 executes the computer instructions, the wearable device can perform the voice control method described in the foregoing embodiments.

The in-ear voice sensor 1305 is configured to capture a first voice component of voice information, the out-of-ear voice sensor 1306 is configured to capture a second voice component of the voice information, and the bone vibration sensor 1307 is configured to capture a third voice component of the voice information.

The memory 1301 may be a read-only memory (ROM), a static storage device, a dynamic storage device, or a random access memory (RAM). The memory 1301 may store a program. When the program stored in the memory 1301 is executed by the processor 1302, the processor 1302 and the communication interface 1303 are configured to perform operations of the voice control method in embodiments of this application.

The processor 1302 may be a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the voice control apparatus in embodiments of this application, or perform the voice control method in the method embodiments of this application.

The processor 1302 may alternatively be an integrated circuit chip and has a signal processing capability. In an implementation process, operations of the voice control method in this application may be completed by using a hardware integrated logic circuit in the processor 1302 or by using instructions in a form of software. The processor 1302 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1302 may implement or perform the methods, operations, and logical block diagrams that are disclosed in embodiments of this application. The general-purpose processor may be a microprocessor, or the processor may be any conventional processor or the like. The operations in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 1301. The processor 1302 reads information in the memory 1301, and completes, in combination with hardware of the processor 1302, functions that need to be performed by the units included in the voice control apparatus in embodiments of this application, or performs the voice control method in the method embodiments of this application.

The communication interface 1303 can perform wired communication or wireless communication by using a transceiver apparatus including but not limited to a transceiver, so that the wearable device 1300 can communicate with another device or a communication network. For example, the wearable device may establish a communication connection to a terminal device through the communication interface 1303.

The bus 1304 may include a path for transmitting information between various components (for example, the memory 1301, the processor 1302, and the communication interface 1303) of the wearable device 1300.

Figure 14:
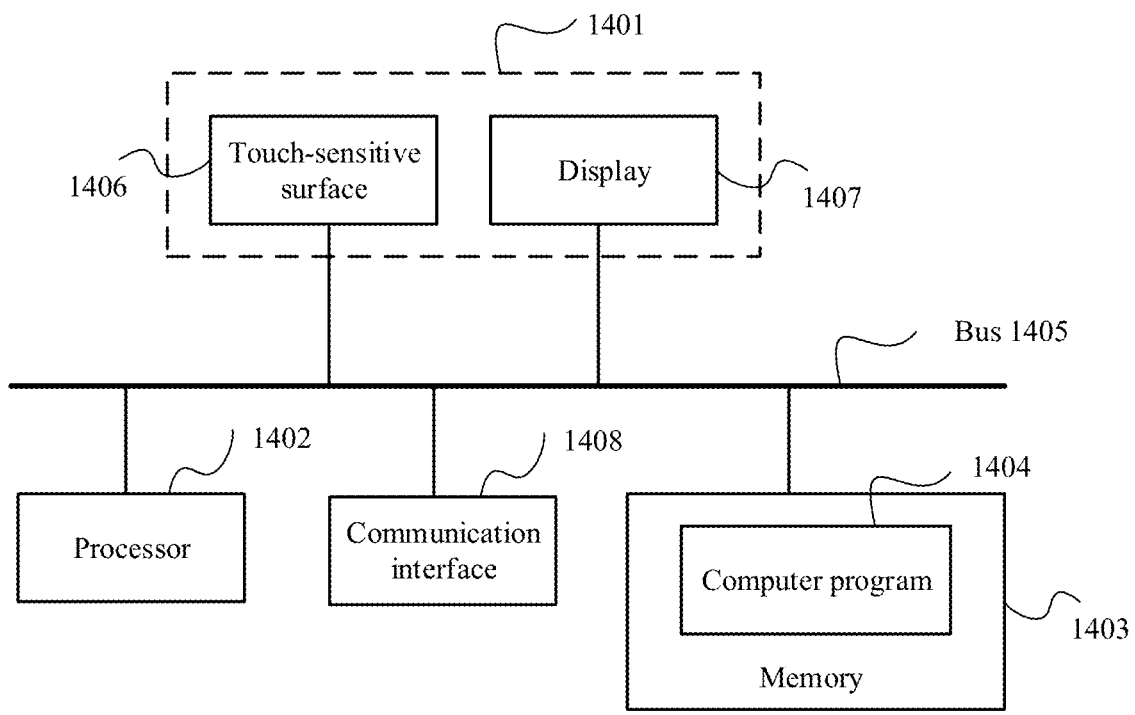
FIG. 14 is a schematic diagram of a terminal according to an embodiment of this application.

Another embodiment of this application further provides a terminal. FIG. 14 is a schematic diagram of a terminal according to an embodiment of this application. The terminal shown in FIG. 14 includes a touchscreen 1401, a processor 1402, a memory 1403, one or more computer programs 1404, a bus 1405, and a communication interface 1408. The touchscreen 1401 includes a touch-sensitive surface 1406 and a display 1407, and the terminal may further include one or more applications (not shown). The components may be connected through one or more communication buses 1405.

The memory 1403 is coupled to the processor 1402. The memory 1403 is configured to store computer program code. The computer program code includes computer instructions. When the processor 1402 executes the computer instructions, the terminal can perform the voice control method described in the foregoing embodiments.

The touchscreen 1401 is configured to interact with a user, and can receive entered information of the user. The user performs input on the mobile phone on the touch-sensitive surface 1406. For example, the user taps an unlock button displayed on the touch-sensitive surface 1406 of the mobile phone.

The memory 1403 may be a read-only memory (ROM), a static storage device, a dynamic storage device, or a random access memory (RAM). The memory 1403 may store a program. When the program stored in the memory 1403 is executed by the processor 1402, the processor 1402 and the communication interface 1408 are configured to perform operations of the voice control method in embodiments of this application.

The processor 1402 may be a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the voice control apparatus in embodiments of this application, or perform the voice control method in the method embodiments of this application.

The processor 1402 may alternatively be an integrated circuit chip and has a signal processing capability. In an implementation process, operations of the voice control method in this application may be completed by using a hardware integrated logic circuit in the processor 1402 or by using instructions in a form of software. The processor 1402 may alternatively be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1402 may implement or perform the methods, operations, and logical block diagrams that are disclosed in embodiments of this application. The general-purpose processor may be a microprocessor, or the processor may be any conventional processor or the like. The operations in the methods disclosed with reference to embodiments of this application may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 1403. The processor 1402 reads information in the memory 1403, and completes, in combination with hardware of the processor 1402, functions that need to be performed by the units included in the voice control apparatus in embodiments of this application, or performs the voice control method in the method embodiments of this application.

The communication interface 1408 can perform wired communication or wireless communication by using a transceiver apparatus including but not limited to a transceiver, so that the terminal 1400 can communicate with another device or a communication network. For example, the terminal may establish a communication connection to the wearable device through the communication interface 1408.

The bus 1405 may include a path for transmitting information between the components (for example, the touchscreen 1401, the memory 1403, the processor 1402, and the communication interface 1408) of the terminal 1400.

It should be noted that, although only the memory, the processor, the communication interface, and the like of each of the wearable device 1300 and the terminal 1400 in FIG. 13 and FIG. 14 are shown, in an embodiment, one of ordinary skilled in the art should understand that the wearable device 1300 and the terminal 1400 each may further include another component necessary for normal running. In addition, based on an requirement, one of ordinary skilled in the art should understand that the wearable device 1300 and the terminal 1400 may further include a hardware component for implementing another additional function. In addition, one of ordinary skilled in the art should understand that the wearable device 1300 and the terminal 1400 each may include only a component necessary for implementing embodiments of this application, but do not necessarily include all the components shown in FIG. 13 or FIG. 14.

Figure 15:
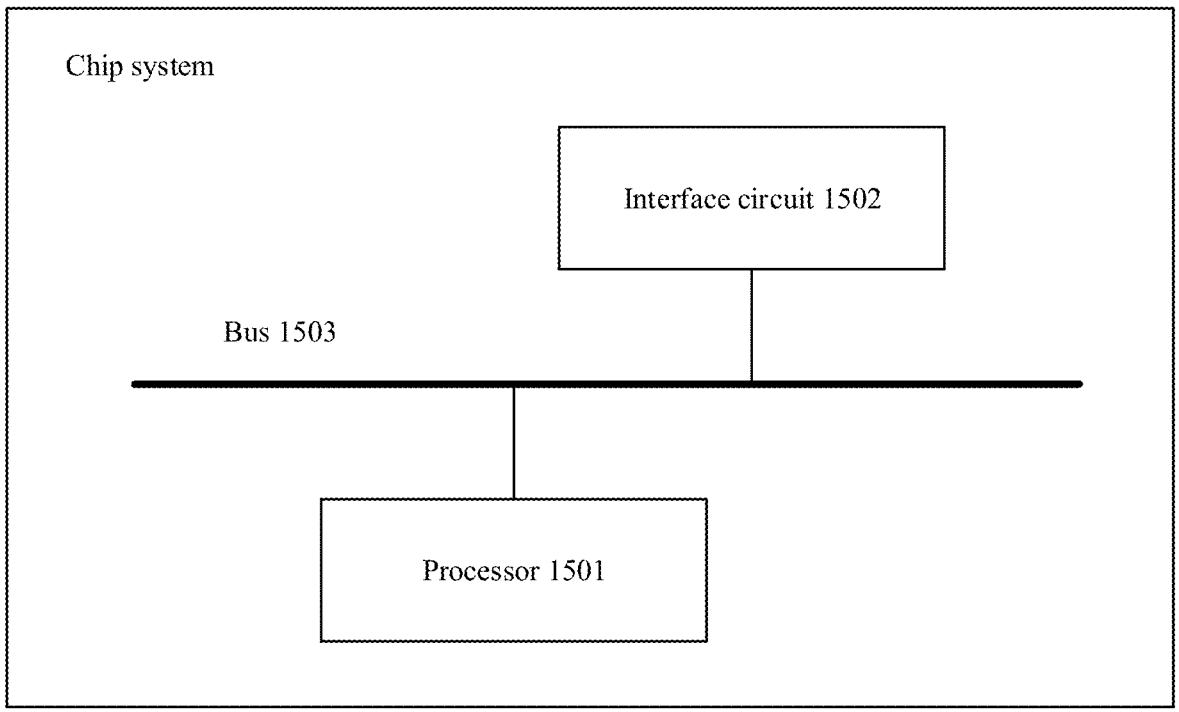
FIG. 15 is a schematic diagram of a chip system according to an embodiment of this application.

Another embodiment of this application further provides a chip system. FIG. 15 is a schematic diagram of a chip system. The chip system includes at least one processor 1501, at least one interface circuit 1502, and a bus 1503. The processor 1501 and the interface circuit 1502 may be interconnected through a line. For example, the interface circuit 1502 may be configured to receive a signal from another apparatus (for example, a memory of a voice control apparatus). For another example, the interface circuit 1502 may be configured to send a signal to another apparatus (for example, the processor 1501). For example, the interface circuit 1502 may read instructions stored in the memory, and send the instructions to the processor 1501. When the instructions are executed by the processor 1501, the voice control apparatus may be enabled to perform the operations in the foregoing embodiments. Certainly, the chip system may further include another discrete device. This is not limited in an embodiment of the application.

Another embodiment of this application further provides a computer-readable storage medium. The computer-readable storage medium stores computer instructions. When the computer instructions are run on a voice control apparatus, the voice control apparatus performs operations performed by a recognition apparatus in the method procedure shown in the foregoing method embodiments.

Another embodiment of this application further provides a computer program product. The computer program product stores computer instructions. When the instructions are run on a recognition apparatus of a voice control apparatus, the recognition apparatus performs operations performed by the recognition apparatus in the method procedure shown in the foregoing method embodiments.

In some embodiments, the disclosed methods may be implemented as computer program instructions encoded in a machine-readable format on a computer-readable storage medium or encoded on another non-transitory medium or product.

In an embodiment, the computer program product is provided by using a signal bearing medium. The signal bearing medium may include one or more program instructions. When the program instructions are run by one or more processors, a function of the voice control method in embodiments of this application may be implemented. Therefore, for example, one or more features in S701 to S707 in FIG. 7 may be borne by one or more instructions associated with the signal bearing medium.

In some examples, the signal bearing medium may include a computer-readable medium, including but not limited to a hard disk drive, a compact disk (CD), a digital video disc (DVD), a digital tape, a memory, a read-only memory (ROM), a random access memory (RAM), or the like.

In an embodiment, the signal bearing medium may include a computer-recordable medium, including but not limited to a memory, a read/write (R/W) CD, an R/W DVD, or the like.

In an embodiment, the signal bearing medium may include a communication medium, including but not limited to a digital and/or analog communication medium (for example, an optical fiber cable, a waveguide, a wired communication link, a wireless communication link), or the like.

The signal bearing medium may be conveyed by a communication medium in a wireless form (for example, a wireless communication medium that complies with the IEEE 802.16 standard or another transmission protocol). The one or more program instructions may be, for example, one or more computer-executable instructions or one or more logic implementation instructions.

Based on the descriptions of the implementations, one of ordinary skilled in the art may clearly understand that for the purpose of convenient and brief descriptions, division into the functional modules is merely used as an example for description. In an actual application, the functions can be allocated to different functional modules for implementation based on a requirement. In other words, an inner structure of an apparatus is divided into different functional modules, to implement all or some of the foregoing described functions. For a working process of the system, apparatus, and unit, refer to a corresponding process in the method embodiments. Details are not described herein again.

One of ordinary skilled in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. One of ordinary skilled in the art may use different methods to implement the described functions for each particular application, but it should not be considered that the implementation goes beyond the scope of this application.

Functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the operations of the methods described in embodiments of this application. The foregoing storage medium includes any medium that can store program code, such as a flash memory, a removable hard disk, a read-only memory, a random access memory, a magnetic disk, or an optical disc.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one place, or may be distributed on a plurality of network units. Some or all of the units may be selected based on an actual requirement, to achieve the objectives of the solutions of embodiments.

The foregoing descriptions are merely implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A voice control method, comprising:
    obtaining voice information of a user, wherein the voice information comprises a first voice component, a second voice component, and a third voice component, the first voice component is captured by an in-ear voice sensor, the second voice component is captured by an out-of-ear voice sensor, and the third voice component is captured by a bone vibration sensor;
    performing voiceprint recognition on each of the first voice component, the second voice component, and the third voice component;
    obtaining identity information of the user based on a voiceprint recognition result of the first voice component, a voiceprint recognition result of the second voice component, and a voiceprint recognition result of the third voice component; and
    when the identity information of the user matches preset identity information, executing an operation instruction determined based on the voice information.

2. The voice control method according to claim 1, wherein before the performing voiceprint recognition on the first voice component, the second voice component, and the third voice component, the method further comprises:
    performing keyword detection on the voice information, or detecting user input.

3. The voice control method according to claim 2, wherein before the performing keyword detection on the voice information, or detecting user input, the method further comprises:
    obtaining a worn state detection result of a wearable device.

4. The voice control method according to claim 1, wherein the performing voiceprint recognition on the first voice component comprises:
    performing feature extraction on the first voice component, to obtain a first voiceprint feature, and calculating a first similarity between the first voiceprint feature and a first registered voiceprint feature of the user, wherein the first registered voiceprint feature is obtained by performing feature extraction on a first registered voice by using a first voiceprint model, and the first registered voiceprint feature indicates a preset audio feature of the user captured by the in-ear voice sensor.

5. The voice control method according to claim 1, wherein the performing voiceprint recognition on the second voice component comprises:
    performing feature extraction on the second voice component, to obtain a second voiceprint feature, and calculating a second similarity between the second voiceprint feature and a second registered voiceprint feature of the user, wherein the second registered voiceprint feature is obtained by performing feature extraction on a second registered voice by using a second voiceprint model, and the second registered voiceprint feature indicates a preset audio feature of the user captured by the out-of-ear voice sensor.

6. The voice control method according to claim 1, wherein the performing voiceprint recognition on the third voice component comprises:
    performing feature extraction on the third voice component, to obtain a third voiceprint feature, and calculating a third similarity between the third voiceprint feature and a third registered voiceprint feature of the user, wherein the third registered voiceprint feature is obtained by performing feature extraction on a third registered voice by using a third voiceprint model, and the third registered voiceprint feature indicates a preset audio feature of the user captured by the bone vibration sensor.

7. The voice control method according to claim 1, wherein the obtaining identity information of the user based on the voiceprint recognition result of the first voice component, the voiceprint recognition result of the second voice component, and the voiceprint recognition result of the third voice component comprises:
    determining a first fusion coefficient corresponding to a first similarity, a second fusion coefficient corresponding to a second similarity, and a third fusion coefficient corresponding to a third similarity; and
    fusing the first similarity, the second similarity, and the third similarity based on the first fusion coefficient, the second fusion coefficient, and the third fusion coefficient, to obtain a fused similarity score, and if the fused similarity score is greater than a first threshold, determining that the identity information of the user matches the preset identity information.

8. The voice control method according to claim 7, wherein the determining the first fusion coefficient, the second fusion coefficient, and the third fusion coefficient comprises:
obtaining a decibel of an ambient sound based on a sound pressure sensor;
determining a playing volume based on a playing signal of a loudspeaker; and
determining each of the first fusion coefficient, the second fusion coefficient, and the third fusion coefficient based on the decibel of the ambient sound and the playing volume, wherein
the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value.

9. The voice control method according to claim 1, wherein the operation instruction comprises an unlocking instruction, a payment instruction, a power-off instruction, an application starting instruction, or a call instruction.

10. A wearable device, comprising:
an in-ear voice sensor configured to capture a first voice component of voice information,
an out-of-ear voice sensor configured to capture a second voice component of the voice information,
a bone vibration sensor configured to capture a third voice component of the voice information,
a processor, and
a memory coupled to the processor to store instructions, which when executed by the processor, cause the wearable device to perform a voice control method, comprising:
obtaining voice information of a user, wherein the voice information comprises the first voice component, the second voice component, and the third voice component, the first voice component is captured by the in-ear voice sensor, the second voice component is captured by the out-of-ear voice sensor, and the third voice component is captured by the bone vibration sensor;
performing voiceprint recognition on each of the first voice component, the second voice component, and the third voice component;
obtaining identity information of the user based on a voiceprint recognition result of the first voice component, a voiceprint recognition result of the second voice component, and a voiceprint recognition result of the third voice component; and
when the identity information of the user matches preset identity information, executing an operation instruction determined based on the voice information.

11. The wearable device according to claim 10, wherein before the performing voiceprint recognition on the first voice component, the second voice component, and the third voice component, the method further comprises:
performing keyword detection on the voice information, or detecting user input.

12. The wearable device according to claim 11, wherein before the performing keyword detection on the voice information, or detecting user input, the method further comprises:

obtaining a worn state detection result of the wearable device.

13. The wearable device according to claim 10, wherein the performing voiceprint recognition on the first voice component comprises:
performing feature extraction on the first voice component, to obtain a first voiceprint feature, and calculating a first similarity between the first voiceprint feature and a first registered voiceprint feature of the user, wherein the first registered voiceprint feature is obtained by performing feature extraction on a first registered voice by using a first voiceprint model, and the first registered voiceprint feature indicates a preset audio feature of the user captured by the in-ear voice sensor.

14. The wearable device according to claim 10, wherein the performing voiceprint recognition on the second voice component comprises:
performing feature extraction on the second voice component, to obtain a second voiceprint feature, and calculating a second similarity between the second voiceprint feature and a second registered voiceprint feature of the user, wherein the second registered voiceprint feature is obtained by performing feature extraction on a second registered voice by using a second voiceprint model, and the second registered voiceprint feature indicates a preset audio feature of the user captured by the out-of-ear voice sensor.

15. The wearable device according to claim 10, wherein the performing voiceprint recognition on the third voice component comprises:
performing feature extraction on the third voice component, to obtain a third voiceprint feature, and calculating a third similarity between the third voiceprint feature and a third registered voiceprint feature of the user, wherein the third registered voiceprint feature is obtained by performing feature extraction on a third registered voice by using a third voiceprint model, and the third registered voiceprint feature indicates a preset audio feature of the user captured by the bone vibration sensor.

16. The wearable device according to claim 10, wherein the obtaining identity information of the user based on the voiceprint recognition result of the first voice component, the voiceprint recognition result of the second voice component, and the voiceprint recognition result of the third voice component comprises:
determining a first fusion coefficient corresponding to a first similarity, a second fusion coefficient corresponding to a second similarity, and a third fusion coefficient corresponding to a third similarity; and
fusing the first similarity, the second similarity, and the third similarity based on the first fusion coefficient, the second fusion coefficient, and the third fusion coefficient, to obtain a fused similarity score, and if the fused similarity score is greater than a first threshold, determining that the identity information of the user matches the preset identity information.

17. The wearable device according to claim 16, wherein the determining the first fusion coefficient, the second fusion coefficient, and the third fusion coefficient comprises:
obtaining a decibel of an ambient sound based on a sound pressure sensor;
determining a playing volume based on a playing signal of a loudspeaker; and determining each of the first fusion coefficient, the second fusion coefficient, and the third fusion coefficient based on the decibel of the ambient sound and the playing volume, wherein the second fusion coefficient is negatively correlated with the decibel of the ambient sound, the first fusion coefficient and the third fusion coefficient each are negatively correlated with a decibel of the playing volume, and a sum of the first fusion coefficient, the second fusion coefficient, and the third fusion coefficient is a fixed value.

18. The wearable device according to claim 10, wherein the operation instruction comprises an unlocking instruction, a payment instruction, a power-off instruction, an application starting instruction, or a call instruction.

19. A terminal, comprising:

a memory, and a processor coupled to the processor, to store instructions, which when executed by the processor, cause the terminal to perform a voice control method, comprising:

obtaining voice information of a user, wherein the voice information comprises a first voice component, a second voice component, and a third voice component, the first voice component is captured by an in-ear voice sensor, the second voice component is captured by an out-of-ear voice sensor, and the third voice component is captured by a bone vibration sensor;

performing voiceprint recognition on each of the first voice component, the second voice component, and the third voice component;

obtaining identity information of the user based on a voiceprint recognition result of the first voice component, a voiceprint recognition result of the second voice component, and a voiceprint recognition result of the third voice component; and when the identity information of the user matches preset identity information, executing an operation instruction determined based on the voice information.

20. A chip system applied to an electronic device, the chip system comprises one or more interface circuits and a processor, the interface circuit and the processor are connected to each other through a line, the interface circuit is configured to: receive a signal from a memory of the electronic device, and send the signal to the processor, the signal comprises computer instructions stored in the memory, and when the processor executes the computer instructions, the electronic device performs a voice control method comprising:

obtaining voice information of a user, wherein the voice information comprises a first voice component, a second voice component, and a third voice component, the first voice component is captured by an in-ear voice sensor, the second voice component is captured by an out-of-ear voice sensor, and the third voice component is captured by a bone vibration sensor;

performing voiceprint recognition on each of the first voice component, the second voice component, and the third voice component;

obtaining identity information of the user based on a voiceprint recognition result of the first voice component, a voiceprint recognition result of the second voice component, and a voiceprint recognition result of the third voice component; and when the identity information of the user matches preset identity information, executing an operation instruction determined based on the voice information.

* * * * *